US006817794B2

(12) United States Patent
Kakutani

(10) Patent No.: US 6,817,794 B2
(45) Date of Patent: Nov. 16, 2004

(54) PRINTER

(75) Inventor: Junichi Kakutani, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 259 days.

(21) Appl. No.: 09/740,873

(22) Filed: Dec. 21, 2000

(65) Prior Publication Data

US 2001/0007619 A1 Jul. 12, 2001

(30) Foreign Application Priority Data

Jan. 6, 2000 (JP) ........................................ 2000-000808

(51) Int. Cl.[7] .............................................. B41J 11/42
(52) U.S. Cl. ...................... 400/582; 400/605; 271/9.06; 399/391
(58) Field of Search .............................. 400/61, 62, 67, 400/68, 582, 584, 605, 624, 626; 271/9.01, 9.02, 9.04, 9.06; 399/16, 389, 391

(56) References Cited

U.S. PATENT DOCUMENTS

| 4,725,869 | A | * | 2/1988 | Umezawa et al. ............. 355/24 |
| 4,804,997 | A | * | 2/1989 | Mizude et al. ............. 271/9.06 |
| 5,061,958 | A | * | 10/1991 | Bunker et al. .............. 355/209 |
| 5,544,875 | A | * | 8/1996 | Obara ........................ 271/176 |
| 5,610,728 | A | * | 3/1997 | Sobue ........................ 358/434 |
| 5,781,310 | A | * | 7/1998 | Nakamura et al. .......... 358/407 |
| 6,024,505 | A | * | 2/2000 | Shinohara ................... 345/961 |
| 6,027,268 | A | * | 2/2000 | Bischel et al. .............. 400/582 |
| 6,204,872 | B1 | * | 3/2001 | Hashimoto et al. ......... 271/145 |
| 6,285,852 | B1 | * | 9/2001 | Etoh et al. .................. 399/367 |
| 6,516,178 | B2 | * | 2/2003 | Fukushima ................. 399/376 |
| 6,701,099 | B2 | * | 3/2004 | Yokobori et al. ............ 399/45 |

FOREIGN PATENT DOCUMENTS

JP          58-117566          7/1983

* cited by examiner

Primary Examiner—Ren Yan
(74) Attorney, Agent, or Firm—Westerman, Hattori, Daniels & Adrian, LLP

(57) ABSTRACT

In the case where the paper size and paper type other than that stored in the tray of the printer is specified by the printing job data, through registration to the alternative table an alternative printing is performed on the papers stored in a predetermined tray. Even in the case where there is no paper of a specified size and type the next time on, the printer does not become in the paper disagreement error condition, and the printing processing is executed. Thus, it is not necessary to change the setting of the tray or depress the CONTINUE switch in each printing job data, and the printing processing is continued. Therefore, operability in users is enhanced.

12 Claims, 22 Drawing Sheets

Changing paper in tray

Compulsory printing by CONTINUE switch

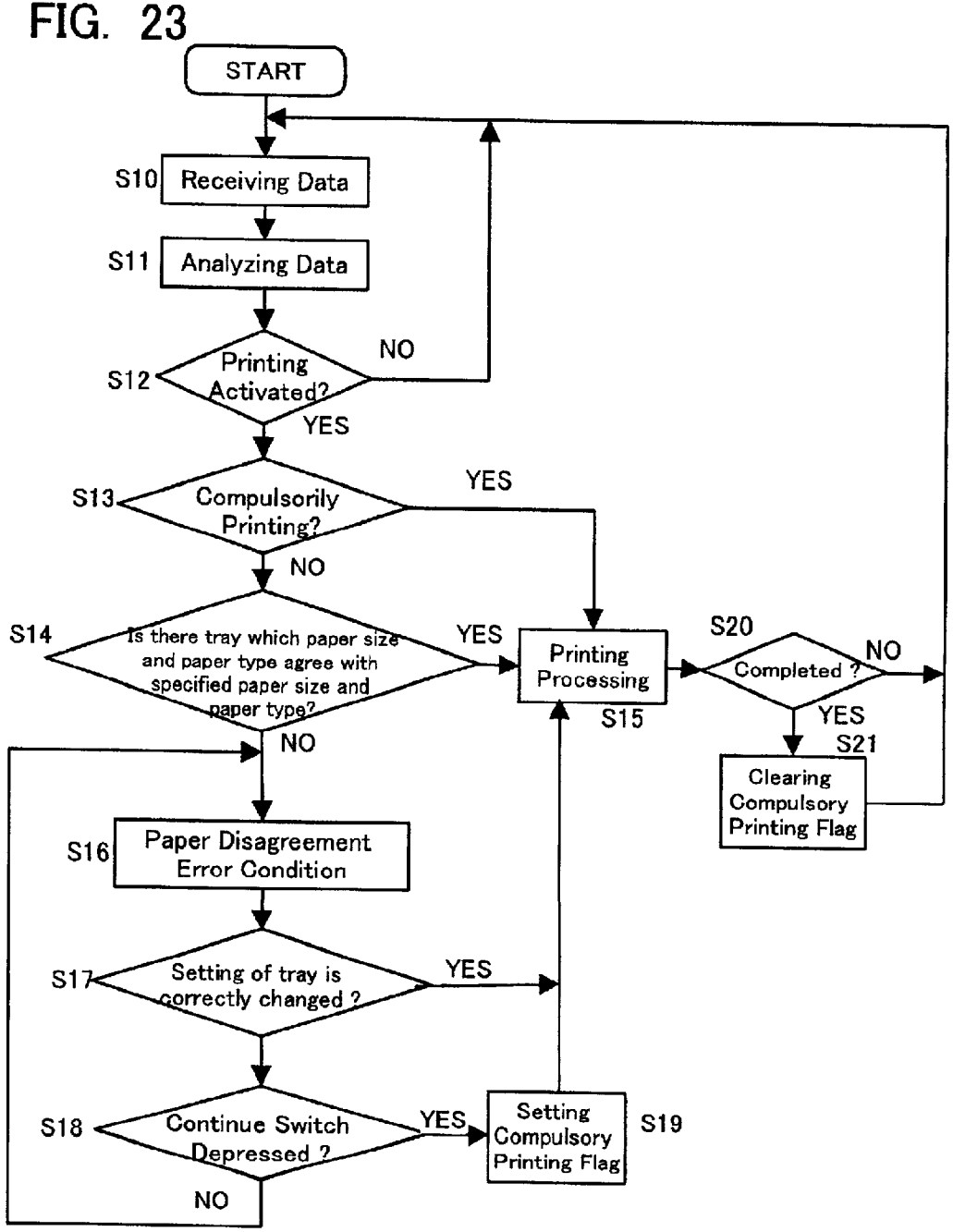

PRINTER

BACKGROUND OF THE INVENTION

1. Field of the Invention

The present invention relates to a printer which selects one of a plurality of trays, and prints on a paper stored in the selected tray based on printing job data containing information for specifying a paper size, a paper type and a tray from a host device.

2. Description of the Related Arts

A certain printer comprises a plurality of trays for storing papers having different sizes or different types. In the printer, a size and type of the paper stored in each tray have in advance been established, and the printer stores the size and type of the paper corresponding to each tray in an inner memory. The size and type of the paper are input from, for example, a control panel provided in the printer by a user. Alternatively, the size of the paper stored in the tray is automatically detected by a paper size sensor provided in the printer, etc., and the size may be established.

FIG. 21 is a typical view showing a selection of a tray. In FIG. 21, a printer comprises two trays (TRAY) 1, 2. As shown in FIG. 21, in the case where the size and type of the paper corresponding to each tray of the printer have in advance been set, the printer receives printing job data including information for specifying a paper size, a paper type and a tray, and printing data from the host device. The printer selects a tray according to the indication information. At this time, in the case where the paper size and paper type set for the selected tray agree with the paper size and paper type indicated by the printing job data, the printer prints on the specified paper of the tray. On the other hand, in the case where the paper size and paper type are not agreed, the printer confirms whether or not there is a tray which agrees with the paper size and paper type among the other trays, and if any, the paper of the tray is printed, and if not, the printer becomes in a paper disagreement condition, and the printing is temporally disconnected. At this time, for example, the paper disagreement error condition is cancelled by the following processing:

FIGS. 22A and 22B are diagrams for explaining a processing of canceling an error condition of the printer when the paper size and paper type do not agree. In FIG. 22, from the host device, the printing job data specify a paper size A, a paper type X, and a tray 1, and a tray 1 of the printer stores papers of a size A' and a type X, and a tray 2 stores papers of a size A" and a type X". Accordingly, as the paper size and paper type are not agreed, the printer becomes in a paper disagreement error condition. In FIG. 22A, the papers specified in the tray 1 are set, and for example, by operation of a control panel, etc., the paper type and paper size set in the tray 1 are changed to the specifying information included in the printing job data. Thus, the disagreement is cancelled, and as the printer does not become in the paper disagreement error condition, it becomes possible to print.

Furthermore, in FIG. 22B, a continue (CONTINUE) switch provided in an operational panel of the printer is depressed, so that the printer continues compulsorily to print irrespective of disagreement, and the paper stored in the tray 1 is printed.

FIG. 23 is a flowchart of a conventional printing. The printer receives data (step S10), and analyzes the data (step S11). At step S12, in the case where the data is printing job data, a printing activation processing is started. Furthermore, at step S13, in the case where the printer is not compulsorily printing as described later, it is judged whether or not the paper size and paper type of the indicated tray agree with the paper size and paper type specified by the printing job data (step S14). In the case where there is any agreed tray, the printing processing is executed by use of the papers of the tray (step S15). Furthermore, in the case where the printer is compulsorily printing, without judging at step S14, the printing processing is executed by use of the papers of the tray specified by the printing job data.

Furthermore, at step S14, in the case where there is not any agreed tray, the printer becomes in the above paper disagreement error condition (step S16). In this case, as described above, setting of the tray is correctly changed (step S17), or the CONTINUE switch on the control panel is depressed (step S18), whereby the printing processing is executed. Incidentally, if the CONTINUE switch is depressed, a compulsory printing flag is set (step S19). While this flag is set, the paper size and paper type set in the specified tray differ from the specified paper size and paper type, and the compulsory printing processing for printing on the papers stored in the specified tray is executed. When the printing processing is ended (step S20), the compulsory printing flag is cleared (step S21). Accordingly, in the case where papers having a plurality of pages are printed by one time printing job data, each page is not in the paper disagreement error condition, and the compulsory printing condition is held until all the pages are finished printing.

However, in the case where the paper disagreement error occurs, if the setting of the tray is changed in order to cancel it, the change is still maintained even if the printing processing is ended in the printing job data. Accordingly, in the case where the setting of the tray is changed for the temporary printing, it is necessary to return the setting of the tray to a former setting, and there is a problem that operability is inferior. Furthermore, in the case where the paper size is automatically recognized to set, further in the case where there is no paper of the paper size specified by the printing job data, it is not possible to change the setting of the tray.

Furthermore, when the CONTINUE switch is depressed, the printing processing is executed compulsorily for the printing job data, and when the printing processing is ended for the printing job data, the compulsory printing condition is cancelled. Accordingly, in the case where the printer becomes again in an error condition for another printing job data, it is necessary to depress again the CONTINUE switch, and there is a problem that operability is inferior.

SUMMARY OF THE INVENTION

It is therefore the object of the present invention to enhance operability in the case where a paper disagreement error condition occurs in a printer.

In order to achieve the above object, according to a first aspect of the present invention there is provided a printer which selects one of a plurality of trays based on printing job data from a host device and prints on a paper stored therein, comprising an alternative table for registering paper information including at least a paper size or paper type for one tray according to a predetermined indication; and a tray selection unit for selecting the tray corresponding to the printing job data based on the alternative table in the case where the paper corresponding to the paper information specified by the printing job data is not stored in any one of the plurality of trays.

With this configuration, in the case where the paper information other than that stored in the tray of the printer is specified by the printing job data, the specified paper information is registered to an alternative table, so that alternative printing is performed on the papers stored in a predetermined tray. Even in the case where there is no paper of a specified size and type the next time on, the printer does not become in the paper disagreement error condition, and the printing processing is executed. Thus, it is not necessary to change the setting of the tray or depress the CONTINUE switch in each printing job data, and the printing processing is continued. Therefore, operability in users is enhanced.

Preferably, the indication is given in the case where the paper corresponding to the paper information specified by the printing job data is not stored in any one of the plurality of trays, and the paper information specified by the printing job data is not registered for the alternative table. Then the tray selection unit may select a tray specified by the printing job data based on the indication. Alternatively, the tray selection unit may select a tray specified by the indication. with the above configuration, the paper information specified by the printing job data is, for example, registered for the tray specified by the printing job data in the alternative table according to the indication. Alternatively, the paper information specified by the printing job data is registered for the tray specified by the indication.

In the case where the paper information of a paper stored in at least one of the plurality of trays is changed, the registered content of the alternative table may be cleared. The plurality of pieces of paper information may be registered for one tray in the alternative table.

In the case where the printer is connected to a plurality of host devices, the alternative table may be provided in each host device, and the tray selection unit may select one of the plurality of alternative tables based on host device identification information included in the printing job data.

Thus, the alternative table for registering the paper information for alternative printing is managed for each host device. Accordingly, the information of the alternative information in each host device is independent, and the alternative table in one host device does not exert influences on the other host devices. As probability of the occurrence of disagreement error is decreased by executing the alternative printing, it is possible to reduce influences on the other host devices owning jointly the printer, and to contribute to stabilization of a network constituted by the printer and the plurality of host devices.

The printer may further comprise a transmission unit for transmitting an alternative printing confirmation request for the host device if a tray is selected from the alternative table; and a reception unit for receiving a confirmation notice from the host device. After reception of the confirmation notice, a paper stored in the tray selected may be printed.

The printer may further comprise a transmission unit for transmitting a paper disagreement error information to the host device in the case where the paper corresponding to the paper information specified by the printing job data is not stored in any one of the plurality of trays, and the paper information specified by the printing job data is not registered for the alternative table; and a reception unit for receiving the indication from the host device in response to the paper disagreement error information.

The alternative table is preferably stored in a nonvolatile memory.

BRIEF DESCRIPTION OF THE DRAWINGS

FIG. 23 is a flowchart of a conventional printing process.

DESCRIPTION OF THE PREFERRED EMBODIMENTS

Presently preferred embodiments of the present invention will now be described. It will be noted that the technical scope of the present invention is not limited to the embodiments.

Figure 1:
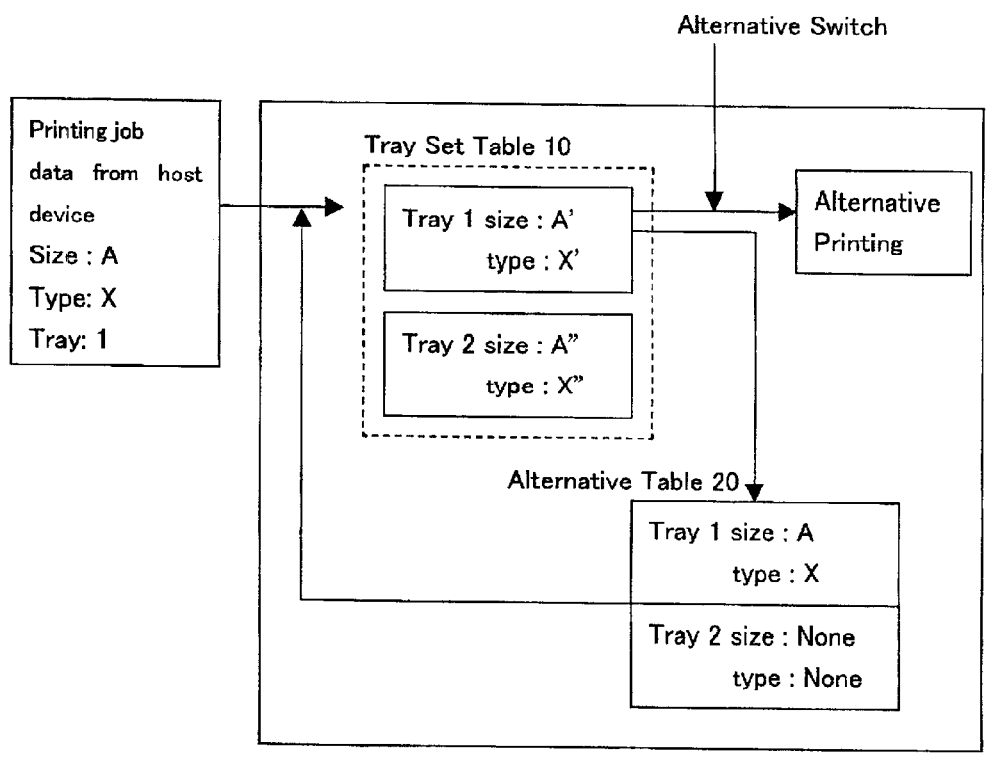
FIG. 1 is a schematic diagram of a printer according to the present invention.

FIG. 1 is a schematic view of a printer according to the present invention. In the printer according to the present invention, in the case where a size and type of papers stored in a tray do not agree with ones of papers specified by printing job data from a host device, it is judged that the papers of the size and type specified are stored in the tray, and the printer has a function of continuing the printing.

For this reason, in the printer according to the present invention, first, if a paper disagreement error occurs, the size and type specified at the time of the paper disagreement error are registered in a table 20 (hereinafter referred to as an alternative table) different from a tray set table 10 for setting the size and type of the papers stored in each tray according to a predetermined indication. The specified size and type are registered for a predetermined tray in the alternative table 20. Furthermore, the printer registers the size and type specified, and also continues to print by use of the papers of the registered tray. As for the predetermined indication, as described below, for example, a depression of a switch separate from a CONTINUE switch provided in the printer, or an indication signal from the host device.

In the case where the papers of the size and type registered as above in the printing job data the next time on are specified, and the papers of the specified size and type are not stored in the tray, the printer prints by use of the papers of the tray in accordance with the alternative table (hereinafter, the printing in accordance with the alternative table is referred to as an alternative printing).

Thus, even in the case where the size and type specified by the printing job data do not agree with those of the papers stored in each tray, the printer does not become in a disagreement error condition and can continue to print automatically.

For example, as shown in FIG. 1, in the tray set table 10, a size A' and a type X' are set in a tray 1, and a size A" and a type X" are set in a tray 2. Accordingly, in the case where the paper size and paper type of specifying information included in the printing job data from the host device are A, X, respectively, the size and type of the papers stored in the trays 1, 2 do not agree with those of the specifying information. However, in the alternative table 20 of the printer, for example, if the paper size A and the paper type X are registered corresponding to the tray 1, the printer does not become in the disagreement error condition, and prints by use of the papers stored in the tray 1 in accordance with the alternative table 20.

In this manner, even in the case where the papers of the size and type specified are not stored in the tray of the printer, the size and type are registered in the alternative table 20 for a predetermined tray, whereby in the case where the same size and type as the registered size and type are next specified, the printer does not become in the disagreement error condition, and executes an alternative printing. Accordingly, for a temporary printing, as there is no necessity for changing setting of the tray, or depressing the CONTINUE switch in each printing job data, it is possible to enhance operability in the printer. Hereinafter, embodiments of the present invention will be explained in further detail.

Incidentally, the paper sizes are, for example, A4, A5, B4, Letter, Legal, or the like, and the paper types are, for example, plane papers, bond papers, color papers, preprint papers, or the like.

Figure 2:
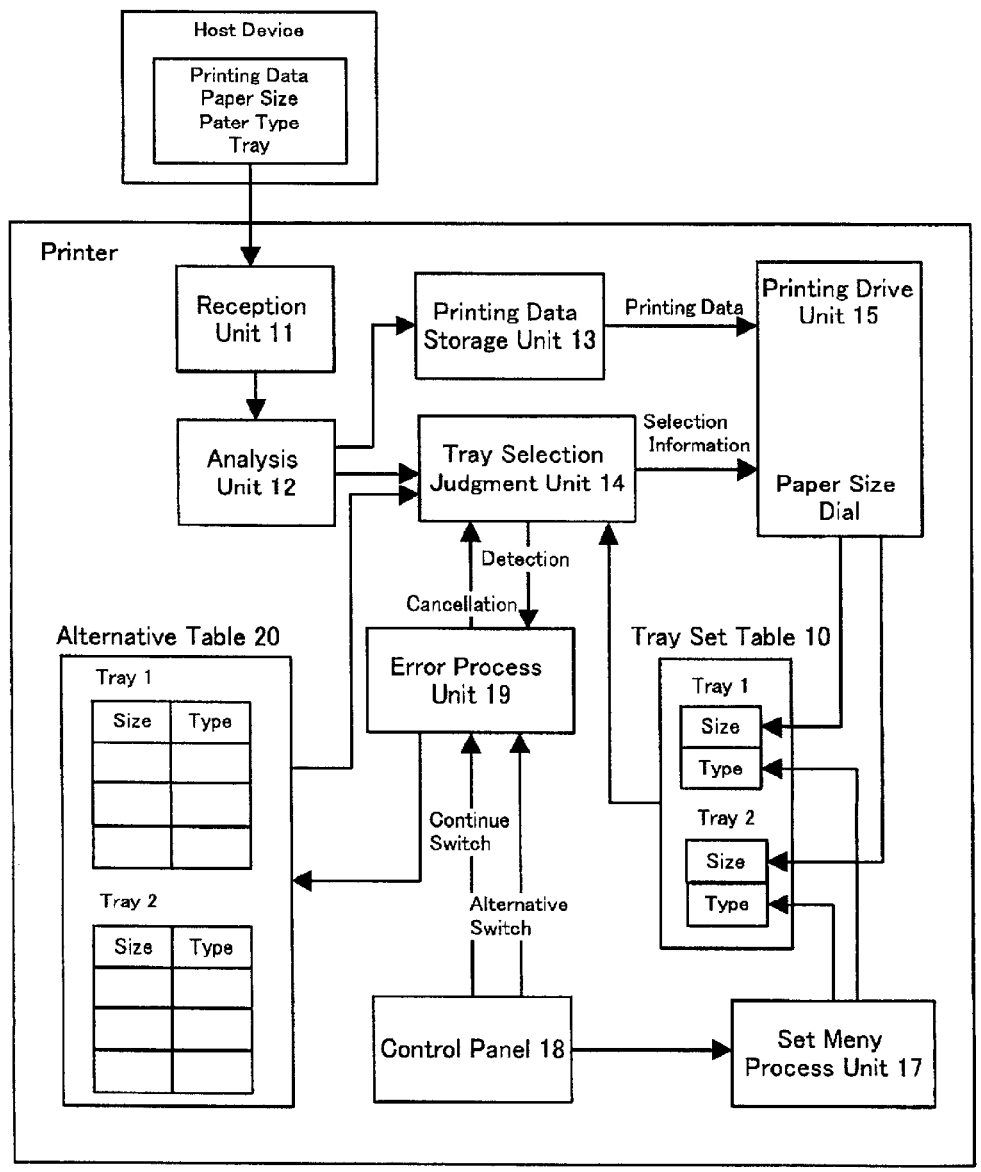
FIG. 2 is a block structural diagram of the printer according to a first embodiment of the present invention.

FIG. 2 is a block structural diagram of a printer according to a first embodiment of the present invention. In FIG. 2, the printer comprises a reception unit 11 for receiving the printing job data from the host device; and an analysis unit 12 for analyzing the printing job data. After printing data included in the printing job data are once stored in a printing data storage unit 13, the printing data are supplied to a printing drive unit 15. Furthermore, specifying information containing the paper size, paper type, and tray out of the printing job data is transmitted to a tray selection judgment unit 14. The tray selection judgment unit 14 supplies tray selection information as information of a tray selected according to the below described judgment to the printing drive unit 15. The printing drive unit 15 prints printing data on the papers stored in the tray according to the tray selection information.

Furthermore, the tray set table 10 stores the paper size and paper type established in each tray. The paper size is established by a paper size dial included in the printing drive unit 15, for example. The paper type is established by a set menu process unit 17 of a control panel 18. The paper size may also be established by the set menu process unit 17.

When the tray selection judgment unit 14 receives specifying information from the host device, the tray selection judgment unit 14 refers to the paper size and paper type set for each tray stored in the tray set table 10. First, the tray selection judgment unit 14 judges whether or not the paper size and paper type set in the specified tray agree with those specified. In the case where agreed, the tray selection judgment unit 14 selects the specified tray. In the case where not agreed, the tray selection judgment unit 14 judges whether or not the paper size and paper type set in the other trays agree with those specified. In the case where there is the agreed tray, the tray selection judgment unit 14 selects the tray.

In the case where there is no agreed tray, the tray selection judgment unit 14 retrieves the alternative table 20. The alternative table 20 is provided in each tray as illustrated, and a plurality of the paper sizes and paper types can be registered therein for each tray. If the tray selection judgment unit 14 finds out the tray in the alternative table 20 in which the paper size and paper type included in the specifying information are registered, the tray selection judgment unit 14 selects the tray. Hereinafter, the tray selected from the alternative table 20 is referred to as an alternative tray.

Furthermore, in the case where the paper size and paper type specified are not registered in the alternative table 20, the tray selection judgment unit 14 supplies error detection information to an error process unit 19. The error process unit 19 recognizes a depression of the CONTINUE switch or a depression of the alternative switch from the control panel 18. When the CONTINUE switch is depressed, the error process unit 19 notifies the tray selection judgment unit 14 of cancellation information. When the tray selection judgment unit 14 receives the cancellation information corresponding to the CONTINUE switch, the tray selection judgment unit 14 selects a tray specified from the host device, and notifies the printing drive unit 15 thereof. Thus, a compulsory printing process is executed.

Furthermore, when the alternative switch is depressed, the error process unit 19 registers the paper size and paper type specified in the tray specified by the alternative table 20. Furthermore, the error process unit 19 notifies the tray selection judgment unit 14 of the cancellation information. When the tray selection judgment unit 14 receives the cancellation information corresponding to an alternative printing switch, the tray selection judgment unit 14 selects the tray specified from the host device, and notifies the printing drive unit 15 thereof. Thus, it is possible to print on the papers stored in the specified tray.

Thereafter, the same paper size and paper type as the above registered paper size and paper type are specified, and in the case where they are not established in the tray set table 10, the alternative printing is performed based on the alternative table 20.

The alternative table 20 is stored in a nonvolatile memory, for example. Thus, if the printer is turned off, the information registered in the alternative table 20 is held. Of course, the alternative table 20 may be stored in a general RAM (random access memory).

Figure 3:
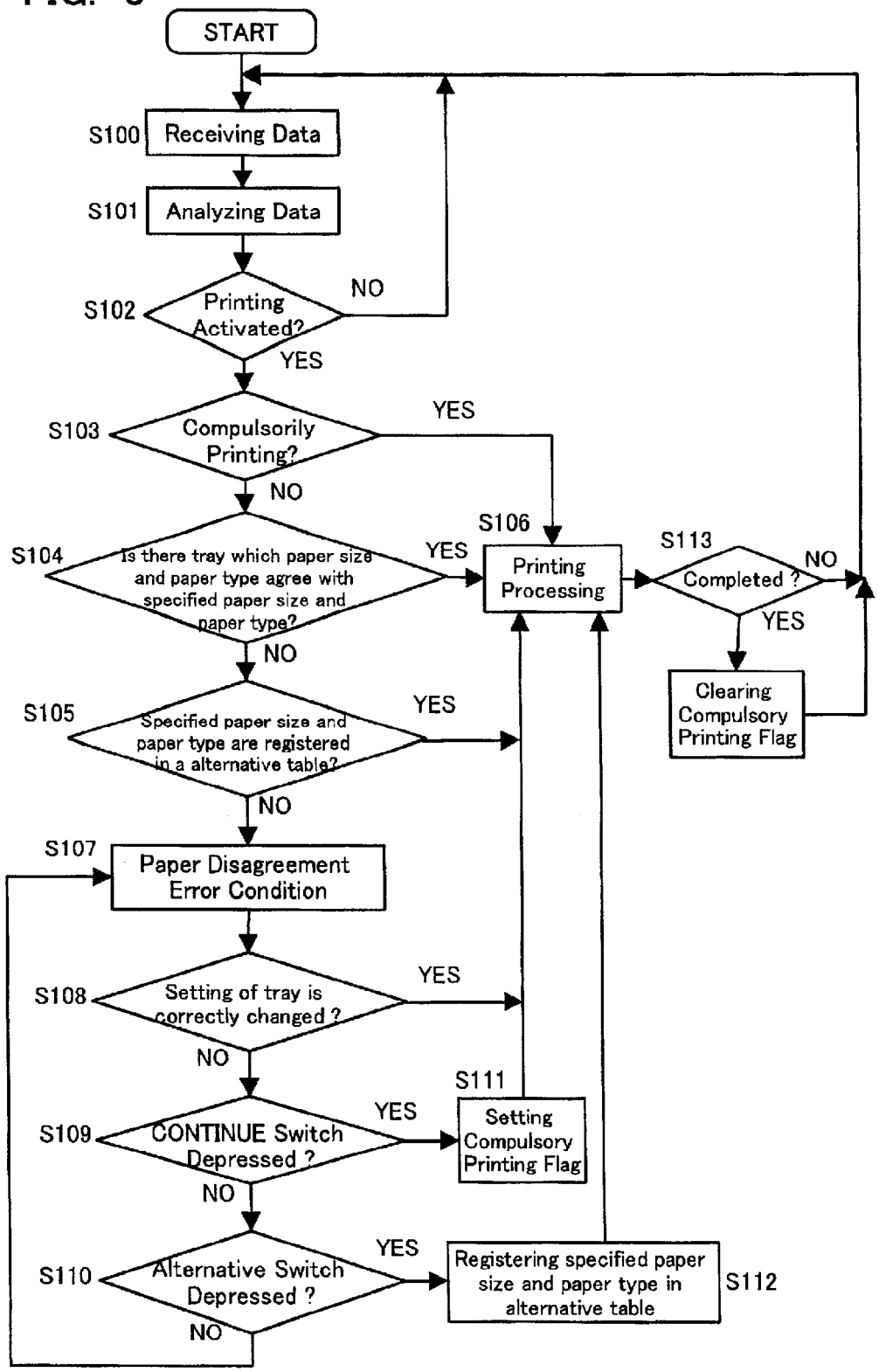
FIG. 3 is a flowchart of a printing process according to the first embodiment of the present invention.

FIG. 3 is a flowchart of a printing process according to the first embodiment of the present invention. The reception unit 11 of the printer receives data (step S100), and the analysis unit 12 analyzes the data (step S101). At step S102, in the case where the data are printing job data, a printing activation processing of the printing drive unit 15 starts. Furthermore, in the case where the printer is not compulsorily printing at step S103, the tray selection judgment unit 14 judges whether or not the paper size and paper type of the specified tray agree with the paper size and paper type specified by the printing job data based on the tray set table 10 (step S104). In the case where agreed, the printing processing is executed by use of the papers of the specified tray (step S106). In the case where the paper size and paper type set in the specified tray differ from the paper size and paper type specified, the tray selection judgment unit 14 judges whether or not the paper size and paper type specified agree with the paper size and paper type set in another tray based on the tray set table 10, and in the case where there is any agreed tray, the printing is executed by use of the papers of the tray. Incidentally, in the case where the printer is compulsorily printing, the printing processing is executed by use of the papers of the tray specified by the printing job data without judging at step S104.

Furthermore, at step S104, in the case where the tray selection judgment unit 14 did not find out an agreed tray from the tray set table 10, the tray selection judgment unit 14 retrieves the alternative table 20, and judges whether or not the paper size and paper type specified are registered in the alternative table 20 (step S105). In the case where registered in the alternative table 20, an alternative printing processing is executed by use of the papers of the corresponding tray (step S106).

Furthermore, at step S105, in the case where not registered even in the alternative table 20, the printer becomes in the paper disagreement error condition (step S107). In such the case, the setting of the tray is correctly changed (step S108), or the CONTINUE switch on the control panel is depressed (step S109), or the alternative printing switch on the control panel is depressed (step S110), whereby the printing processing is continued (step S105). Incidentally, when the CONTINUE switch is depressed, a compulsory printing flag is set (step S111). While this flag is set, the printing processing is executed by use of the papers of the tray specified by the printing job data unconditionally without any judgment at steps S104, S105 (step S105). Furthermore, when the alternative printing switch is depressed, the specified size and type are registered in the alternative table 20 corresponding to the specified tray (step S112), and the printing processing is executed by the papers of the specified tray (step S106).

When the printing processing is ended (step S113), the compulsory printing flag is cleared (step S114).

Figure 4:
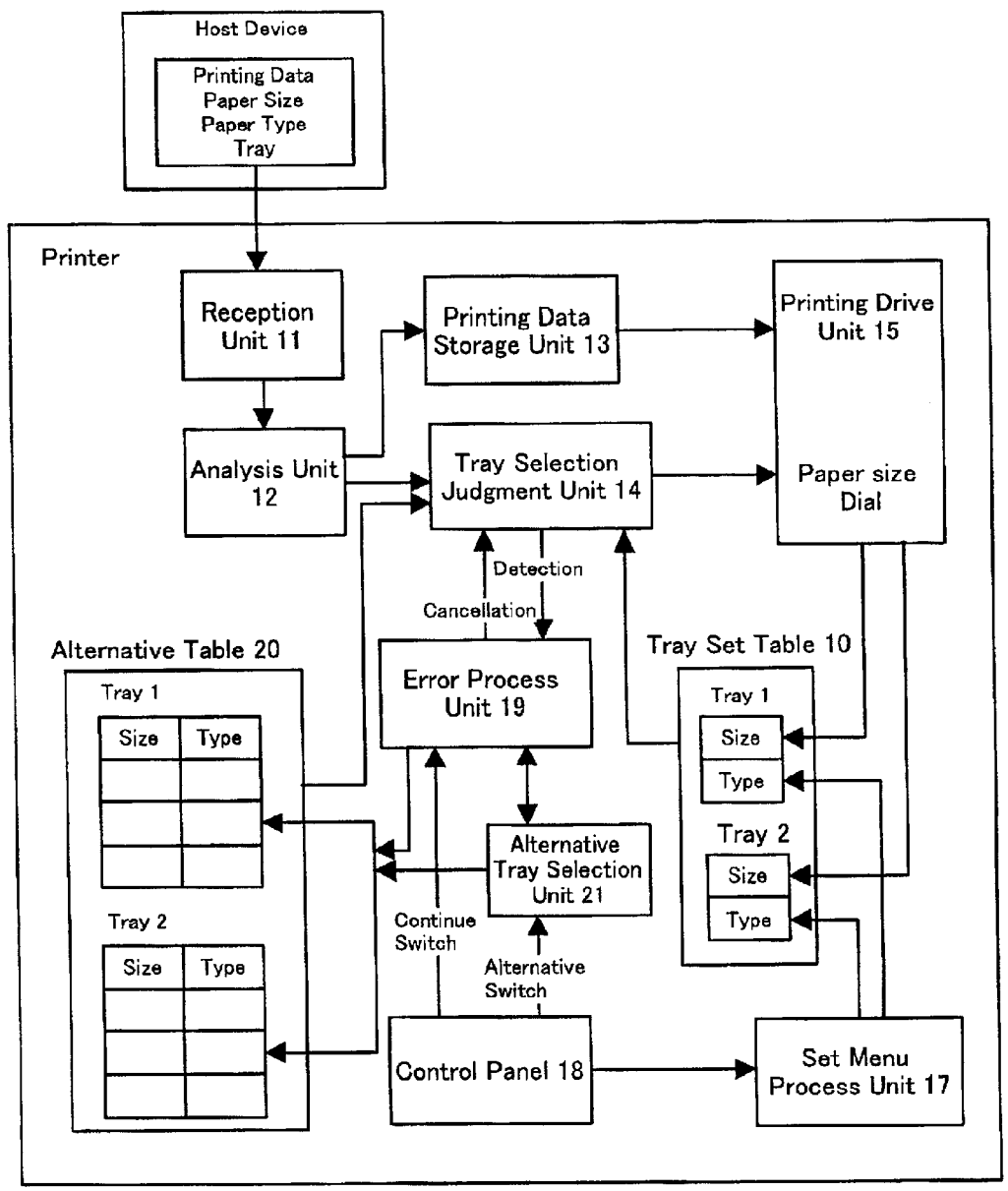
FIG. 4 is a block structural diagram of the printer according to a second embodiment of the present invention.

FIG. 4 is a block structural diagram of the printer according to a second embodiment of the present invention. The printer according to the second embodiment comprises an alternative tray selection unit 21 in the printer according to the first embodiment. If the alternative tray selection unit 21 recognizes a depression of the alternative printing switch, the tray indicated from the control panel 18 by a user is selected. The alternative tray selection unit 21 notifies the error process unit 19 of the selected tray. The error process unit 19 registers the paper size and paper type specified in the tray of the alternative table 20 selected by the alternative tray selection unit 21.

Furthermore, the error process unit 19 notifies the tray selection judgment unit 14 of cancellation information. When the tray selection judgment unit 14 receives the cancellation information corresponding to the alternative printing switch, the tray selection judgment unit 14 notifies the printing drive unit 15 of the tray selected by the alternative tray selection unit 21. Thus, it is possible to print on the papers stored in the selected tray.

In the same manner as in the first embodiment, hereinafter, the same paper size and paper type as those registered as above are specified, and in the case where they are not set in the tray set table 10, the alternative printing is performed based on the alternative table 20.

Figure 5:
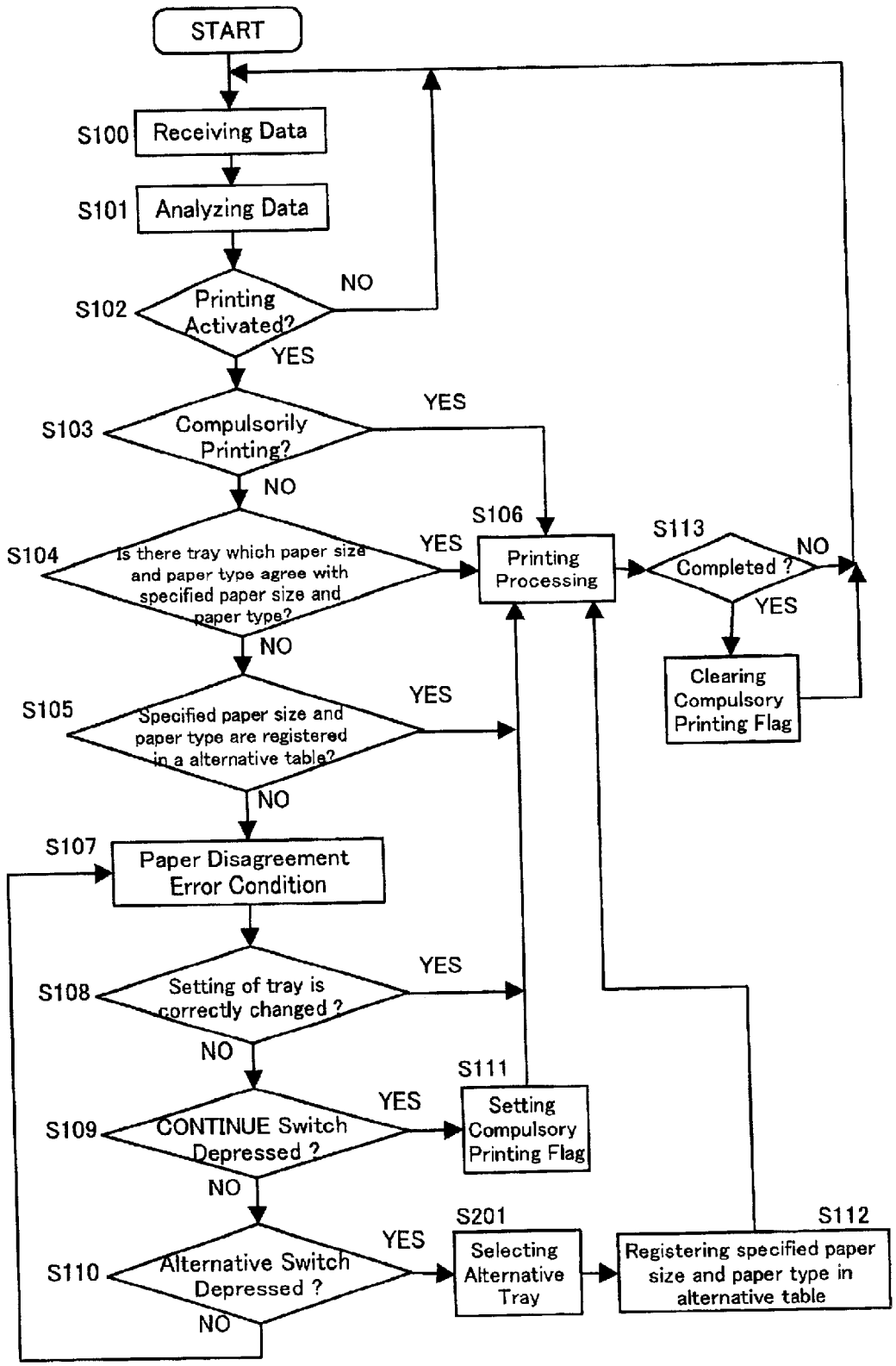
FIG. 5 is a flowchart of a printing process according to the second embodiment of the present invention.

FIG. 5 is a flowchart of a printing processing according to a second embodiment of the present invention. The flowchart of FIG. 5 comprises step S201 in the flowchart according to the first embodiment of FIG. 3. At step S201, the alternative tray selection unit 21 is processed. Namely, if the alternative printing switch is depressed at step S110, one of the plurality of alternative trays in the alternative table 20 is selected according to an input indication from the control panel 18 by a user.

Figure 6:
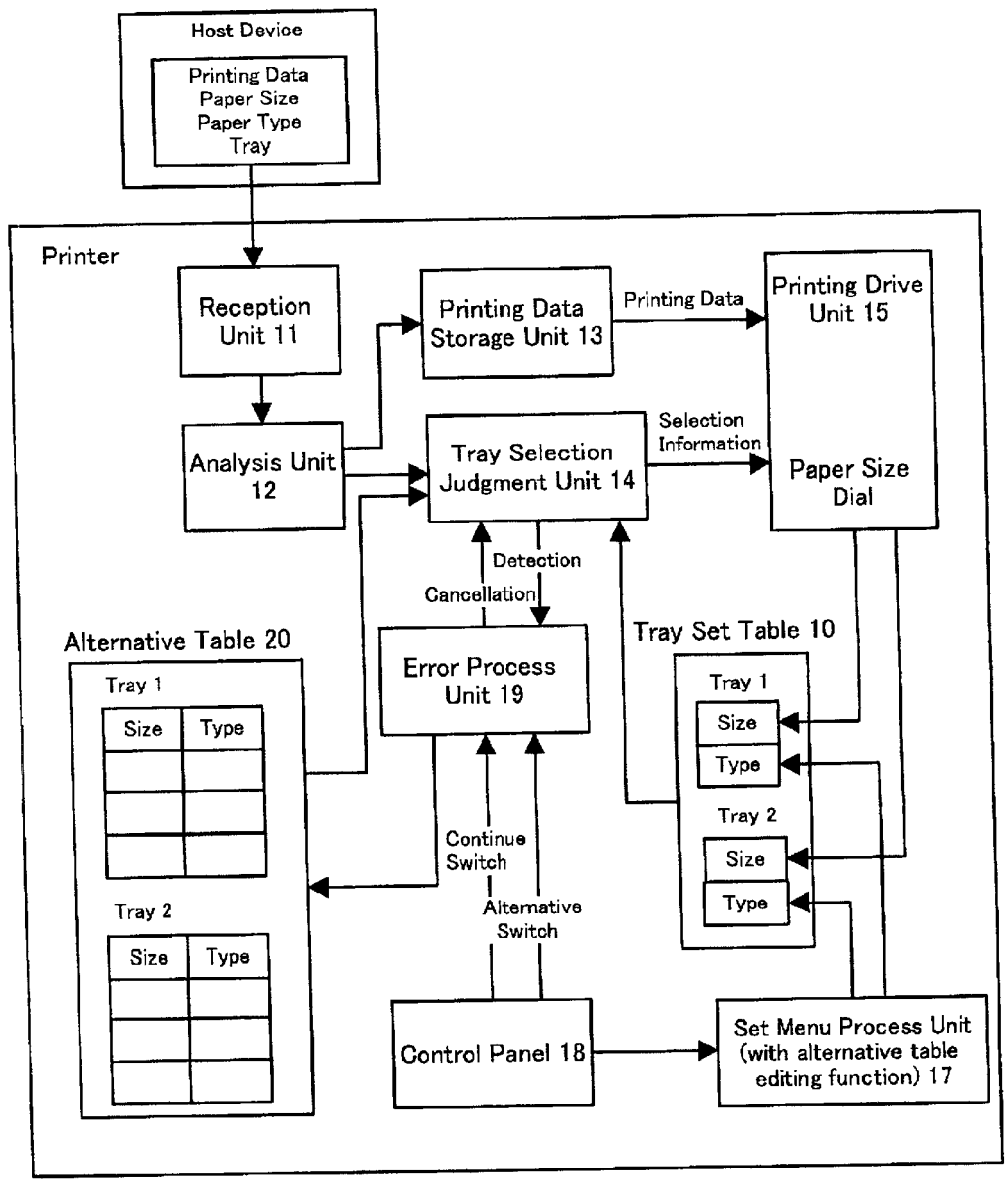
FIG. 6 is a block structural diagram of the printer according to a third embodiment of the present invention.

FIG. 6 is a block structural diagram of a printer according to a third embodiment of the present invention. According to the printer of the third embodiment, in the printer according to the first embodiment, the set menu process unit 17 has an alternative table editing function. The alternative table editing function is one which registers the paper size and paper type in the alternative table 20 according to the input indication from the control panel 18 by the user irrespective of the disagreement error condition, or deletes or changes the paper size and paper type registered already in the alternative table 20. Thus, for example, it is possible to register the paper size and paper type in the alternative table 20 in advance prior to a transfer to the disagreement error condition. Furthermore, after registered once, when the alternative printing is inconvenient, the registration can be deleted.

Figure 7:
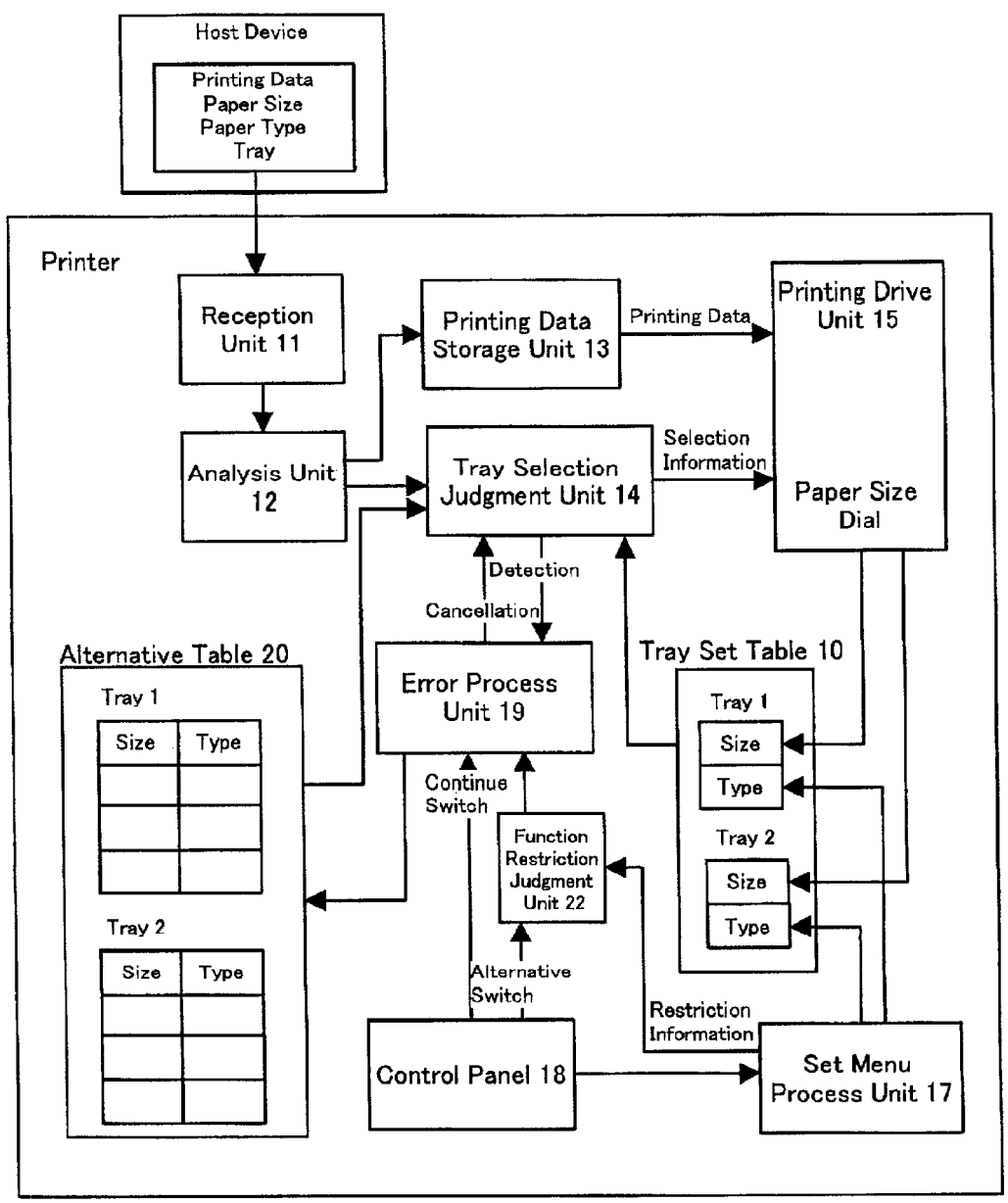
FIG. 7 is a block structural diagram of the printer according to a fourth embodiment of the present invention.

FIG. 7 is a block structural diagram of a printer according to a fourth embodiment of the present invention. According to the printer of the fourth embodiment, in the printer according to the first embodiment, this printer comprises a function restriction judgment unit 22. The function restriction judgment unit 22 can invalidate a depression of the alternative printing switch. If invalidated, even if the alternative printing switch is depressed, the specified paper size and paper type are not registered in the alternative table 20, and the alternative printing is not executed. It is prevented that the specified paper size and paper type are thoughtlessly registered in the alternative table 20.

By the input indication from the control panel 18 by the user, the set menu process unit 17 sets validity/invalidity of the function restriction judgment unit 22. In the case where the function restriction judgment unit 22 is validly set, the function restriction judgment unit 22 notifies the error process unit 19 of the alternative printing switch ON, but in the case where invalidly set, does not notify.

Figure 8:
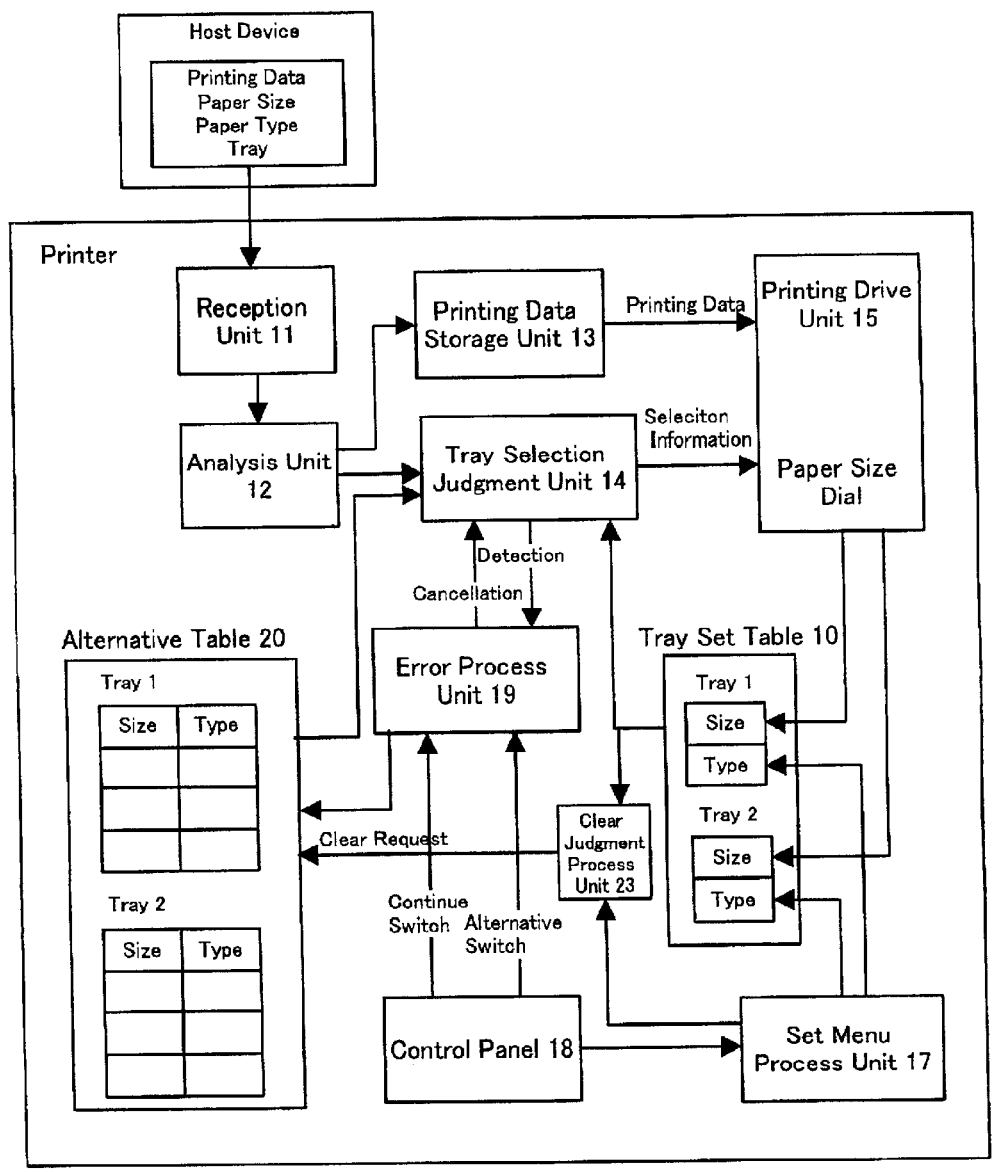
FIG. 8 is a block structural diagram of the printer according to a fifth embodiment of the present invention.

FIG. 8 is a block structural diagram of a printer according to a fifth embodiment of the present invention. According to the printer of the fifth embodiment, in the printer according to the first embodiment, this printer comprises a clear judgment process unit 23. In the case where a setting content of the tray set table is changed, the clear judgment process unit 23 can clear a registration content of the alternative table 20 according to the indication from the set menu process unit 17.

For example, the paper size of the tray 1 of the tray set table 10 is changed to a smaller size (for example, A4 to B5), and assume, for example, the case where a Letter size is registered in the tray 1 of the alternative table 20, and the Letter size is specified from the host device. Even if the alternative printing is performed by the papers of A4 size in the tray 1 prior to the change, as the A4 size and Letter size are not so different from each other, a printing region does not protrude the paper size. However, as A5 size is smaller than the Letter size after the change, the printing region protrudes the paper size, so that the normal printing is not executed. In order to avoid such inconveniences, in the printer according to the fifth embodiment, in the case where the tray set table 10 is changed, a function of clearing also the registration content of the alternative table 20 is automatically added.

By the input indication from the control panel 18 by the user, the set menu process unit 17 sets validity/invalidity of the clear judgment process unit 23. In the case where the clear judgment process unit 23 is validly set, if the setting content of the tray set table 10 is changed, the registration content of the alternative table 20 is cleared. In the case where invalidly set, not cleared.

Next, the case where the printer according to the embodiments of the present invention is applied to a network will be explained.

Figure 9:
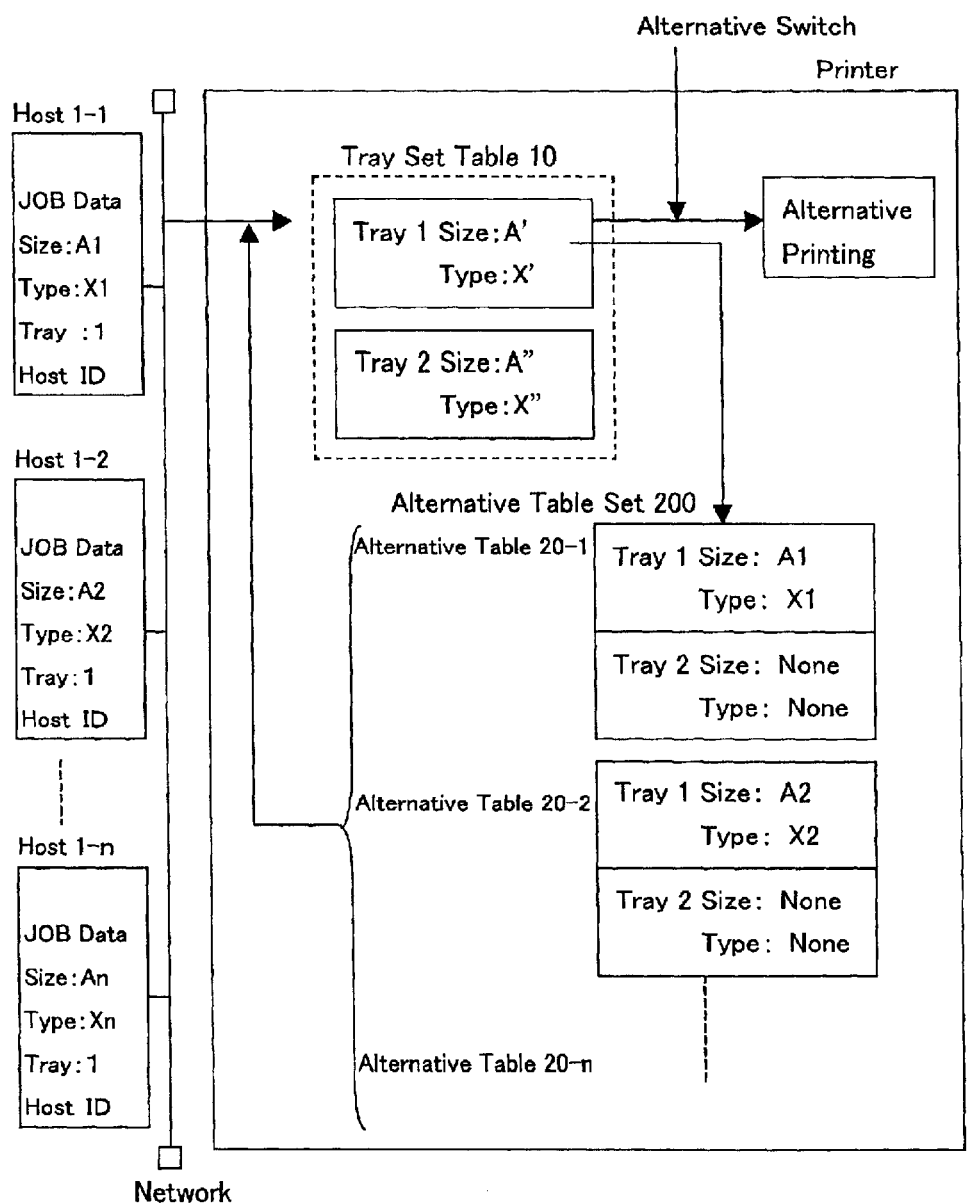
FIG. 9 is a schematic diagram of the printer according to the present invention which is applied to a network.

FIG. 9 is a schematic diagram of the printer which is applied to the network according to the present invention. The printer of FIG. 9 comprises alternative tables 20-1, 20-2, ..., 20-n corresponding to each of the plurality of host devices on the network. A set of the alternative tables 20-1, 20-2, ..., 20-n in each of host devices is referred to as an alternative table set 200. For example, the paper size and paper type specified by the printing job data from a host device 1-1 are registered in the alternative table 20-1, and similarly, the paper size and paper type specified by the printing job data from a host device 1-n are registered in the alternative table 20-n.

In this manner, the printer according to the present invention has the alternative table set 200 comprising the alternative tables 20-1, 20-2, ..., 20-n corresponding to each of the plurality of host devices connected to the network, whereby the alternative tray can be managed in each of the host devices.

Figure 10:
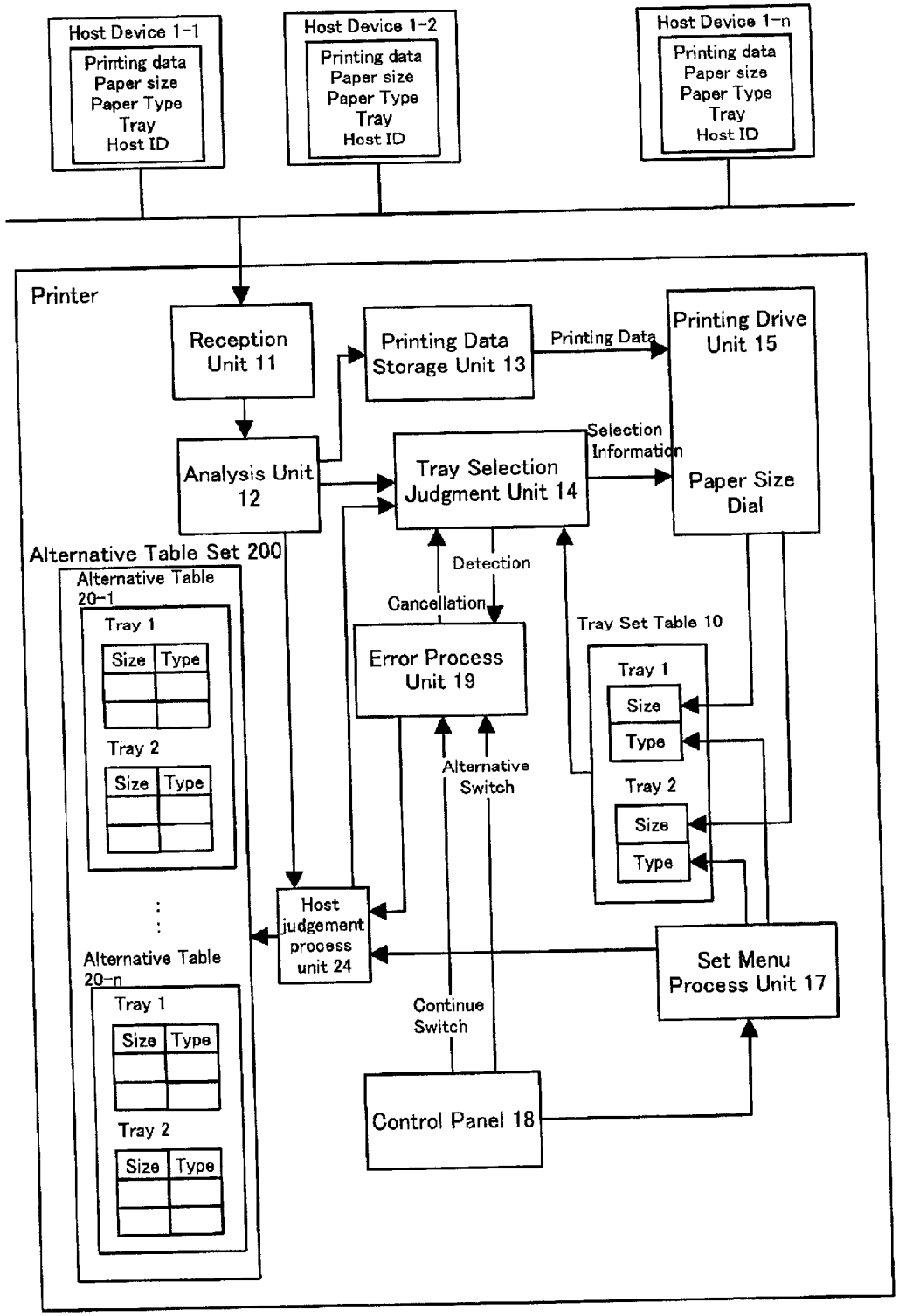
FIG. 10 is a block structural diagram of the printer according to the first embodiment which is applied to the network.

FIG. 10 is a block structural diagram of a printer according to the first embodiment which is applied to the network. The printer of FIG. 10 comprises a host judgment process unit 24 in comparison with FIG. 3. The analysis unit 12 notifies the host judgment process unit 24 of a host ID for discriminating the host device included in the printing job data received in the reception unit 11. The host judgment process unit 24 selects the alternative table 20 corresponding to the host ID from the alternative table set 200.

Figure 11:
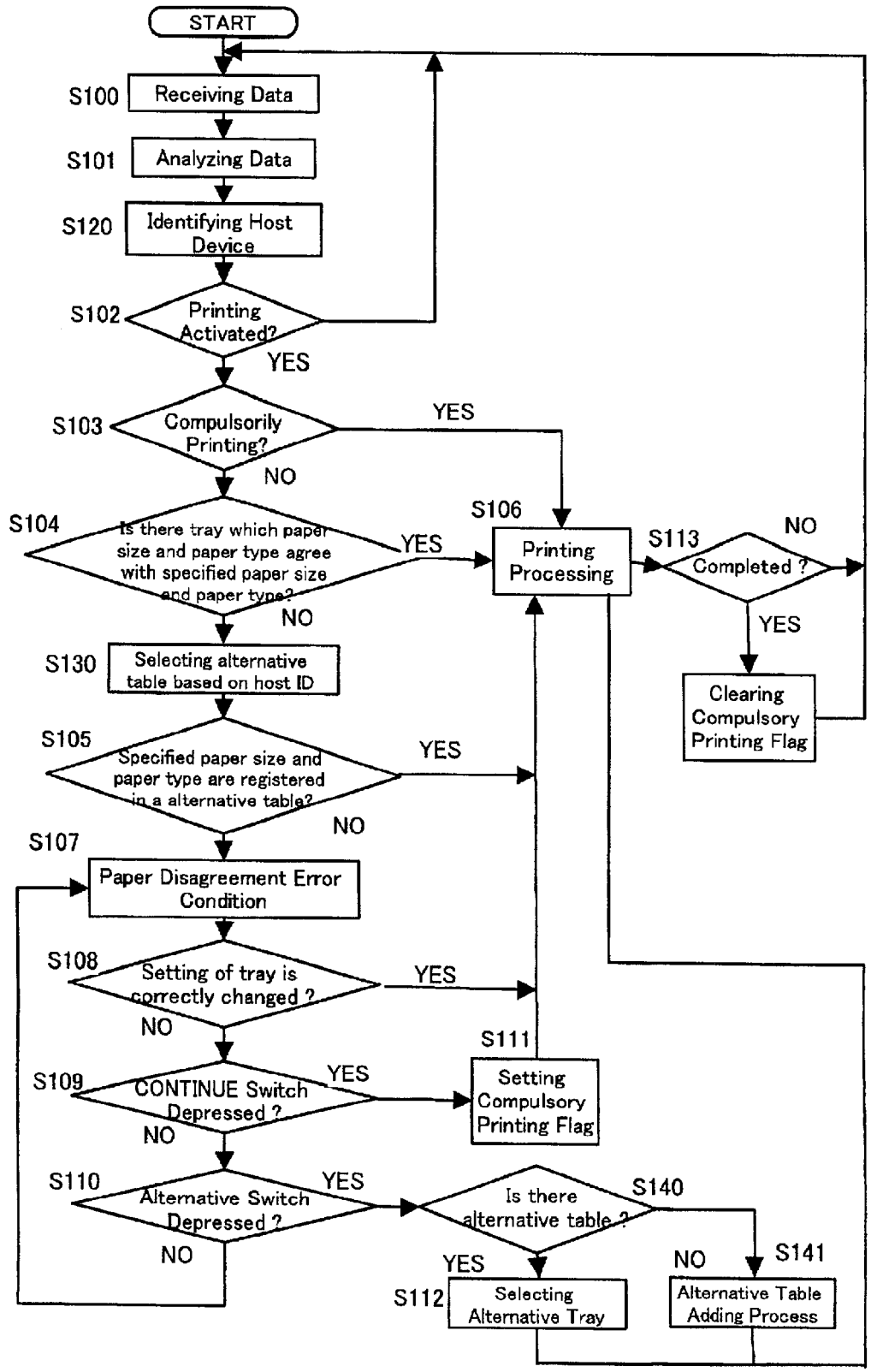
FIG. 11 is a flowchart of the printer according to the first embodiment which is applied to the network.

FIG. 11 is a flowchart of a printing processing according to the first embodiment which is applied to the network. The flowchart of FIG. 11 comprises steps S120, S130, S140, S141 in comparison with FIG. 4. First, according to the data at step S101, the analysis unit 12 extracts the host ID for identifying the host device from the data, (and at step S120, the host judgment process unit 24 identifies the host device which transmitted the data based on the host ID). Furthermore, in the case where there is no tray for storing the paper size and paper type specified at step S104, at step S130, the host judgment process unit 24 selects the alternative table 20 based on the host ID.

Furthermore, at step S110, in the case where the alternative printing switch is depressed, the error process unit 19 notifies the host judgment process unit 24 of a registration request. The host judgment process unit 24 confirms existence of the alternative table 20 corresponding to the host device which becomes in the disagreement error condition, among the alternative table set 200 (step S140). In the case where the alternative table 20 corresponding to the host device has already existed, the alternative table 20 is selected, and the paper size and paper type specified by the selected alternative table 20 are registered for a predetermined tray (step S112). In the case where the corresponding alternative table does not exist, in accordance with the flowchart shown in FIG. 12 below, the alternative table 20 is added to the alternative table set 200, and the paper size and paper type specified are registered in the added alternative table (step S141).

Figure 12:
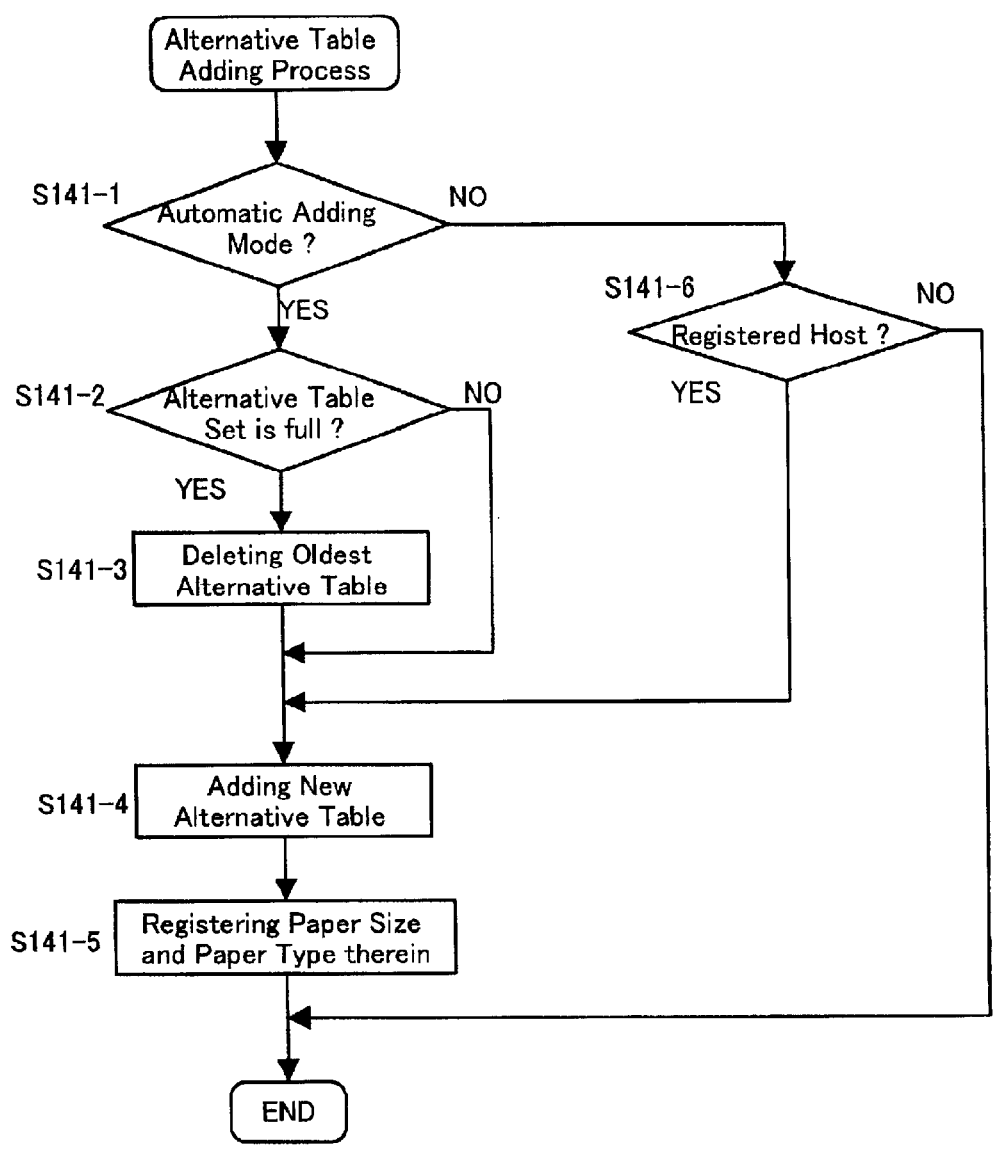
FIG. 12 is a flowchart of an added process of an alternative table 20.
Figure 13:
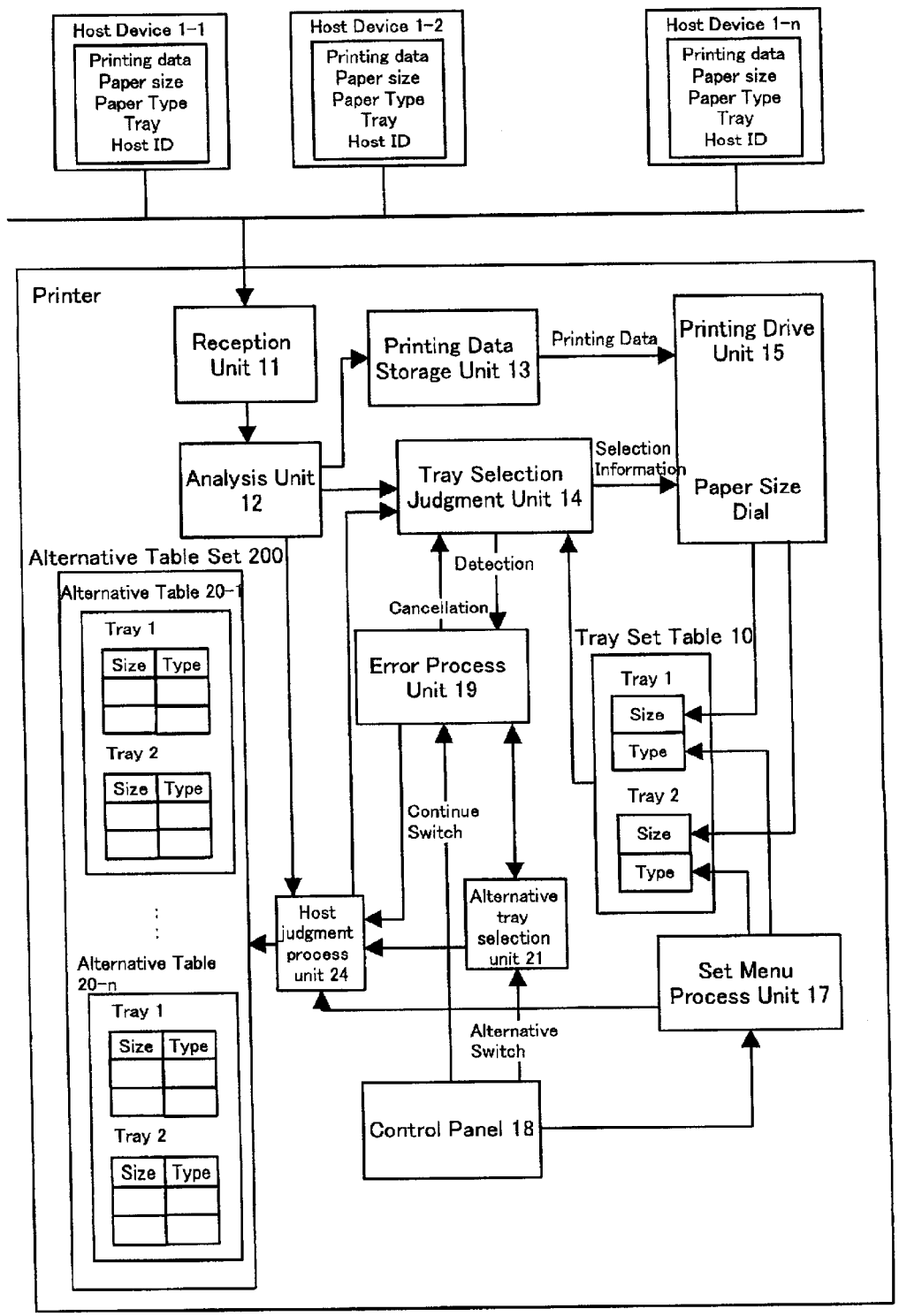
FIG. 13 is a block structural diagram of the printer according to the second embodiment which is applied to the network.
Figure 14:
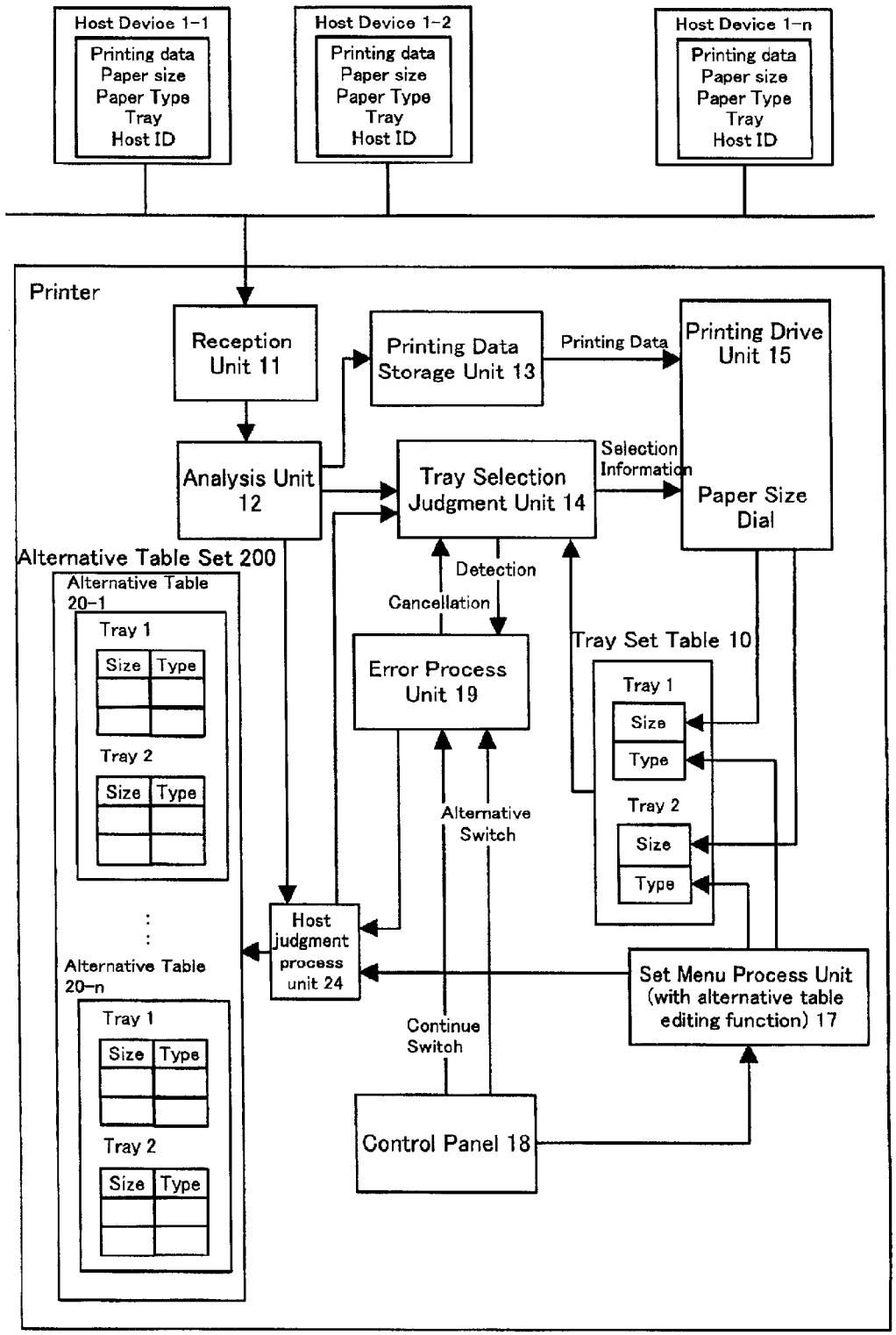
FIG. 14 is a block structural diagram of the printer according to the third embodiment which is applied to the network.
Figure 15:
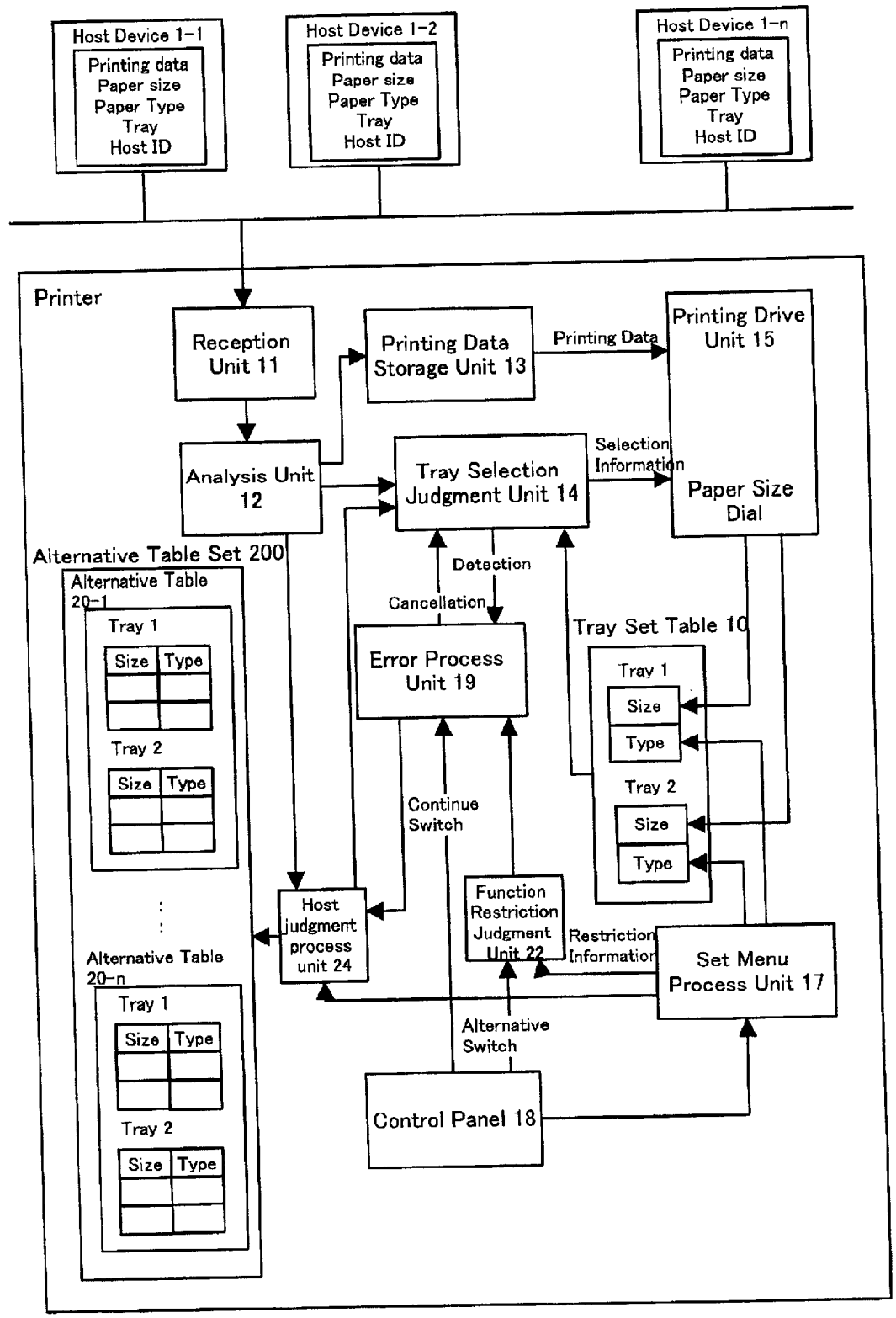
FIG. 15 is a block structural diagram of the printer according to the fourth embodiment which is applied to the network.
Figure 16:
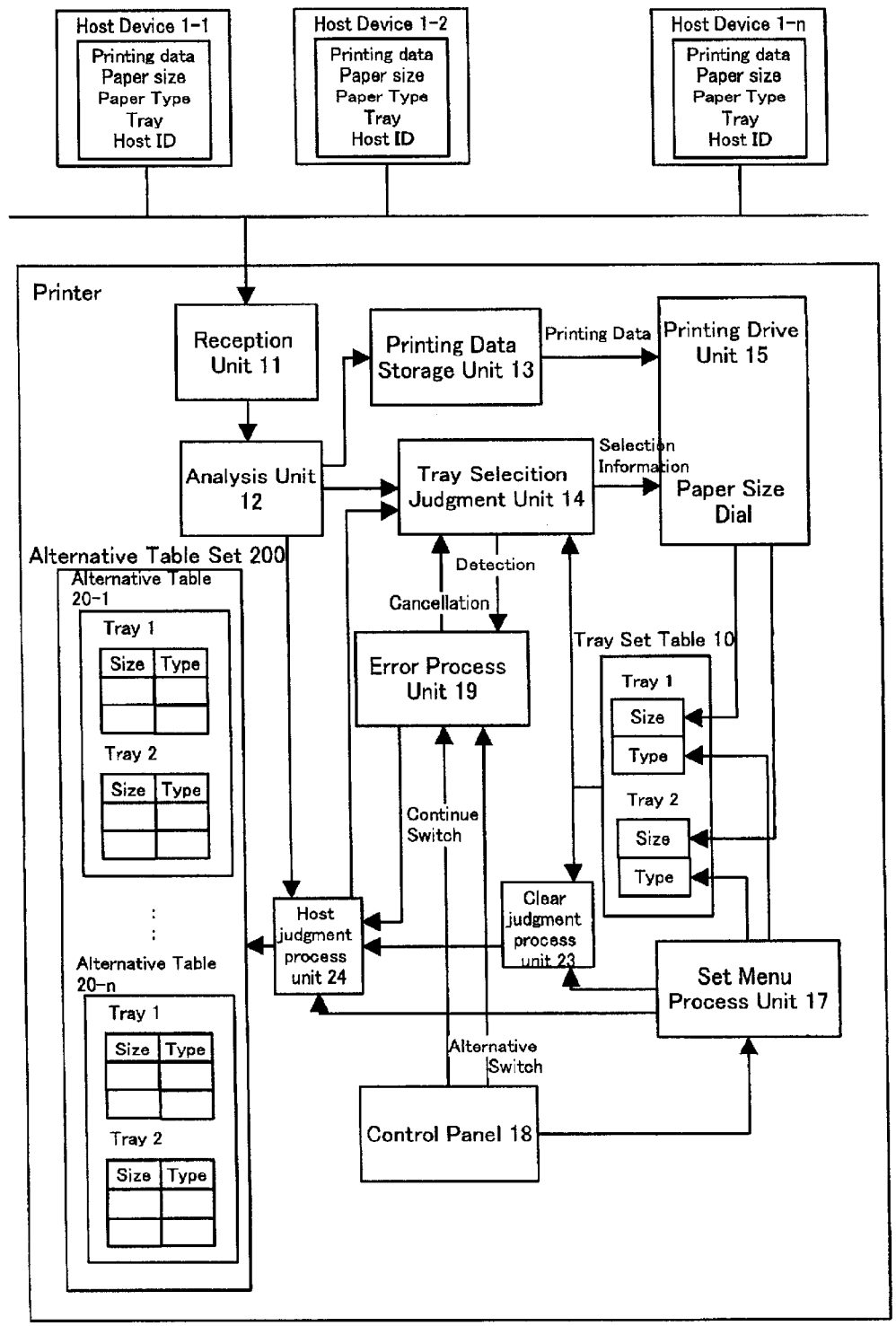
FIG. 16 is a block structural diagram of the printer according to the fifth embodiment which is applied to the network.

FIG. 12 is a flowchart of an adding process (step S141) of the alternative table 20. At step S141-1, it is judged whether or not the printer is in an automatic adding mode. In the case of the automatic adding mode, a remainder of a memory capacity for an alternative table set is confirmed (step S141-2), and in the case where the capacity adding the alternative table 20 does not remain any more, the oldest alternative table 20 is deleted (step S141-3), and a new alternative table 20 is prepared (step S141-4), and the paper size and paper type specified therein are registered (step S141-5).

On the other hand, in the case where the printer is not in an automatic adding mode, at step S141-6, it is confirmed whether or not the host device is registered one, and in the case where the host device is the registered one, a new alternative table 20 is prepared (step S141-4), and the paper size and paper type specified therein are registered (step S141-5). In the case where the use is not registered one, the alternative table is not prepared.

FIGS. 13, 14, 15, and 16 are block structural diagrams of a printer according to the second, third, fourth, and fifth embodiments which are applied to the network, respectively. In each of the printers of FIGS. 4, 6, 7, and 8, each printer comprises a host device judgment process unit 24, in the same manner as above.

Next, a sixth embodiment of the present invention will be explained. In the printer according to the sixth embodiment, in the case where the alternative printing is performed, an alternative notice is transmitted to the host device, and after obtaining a confirmation notice, the alternative printing is executed. Thus, it is possible to inform in advance the user who operates the host device of the alternative printing, and the user can confirm the effect that the alternative printing is executed.

Furthermore, in the printer according to the sixth embodiment, if a paper disagreement error occurs, an error notice is transmitted to the host device, and based on an indication transmitted from the host device, the alternative table is added. In the case where the printer and the plurality of host devices constitute a network, in some cases, the position of the printer is away from the host device. In such the case, the user who operates the host device cannot find out that the printer is in the paper disagreement error condition from the position of the host device. Furthermore, it is necessary that the user moves to the position of the printer in order to depress the alternative printing switch. Then, in order to enhance serviceableness of the user, in stead of the depression of the alternative printing switch, the notice of the disagreement paper error is transmitted from the printer to the host device, and based on the indication from the host device, the alternative table 20 is added.

Figure 17:
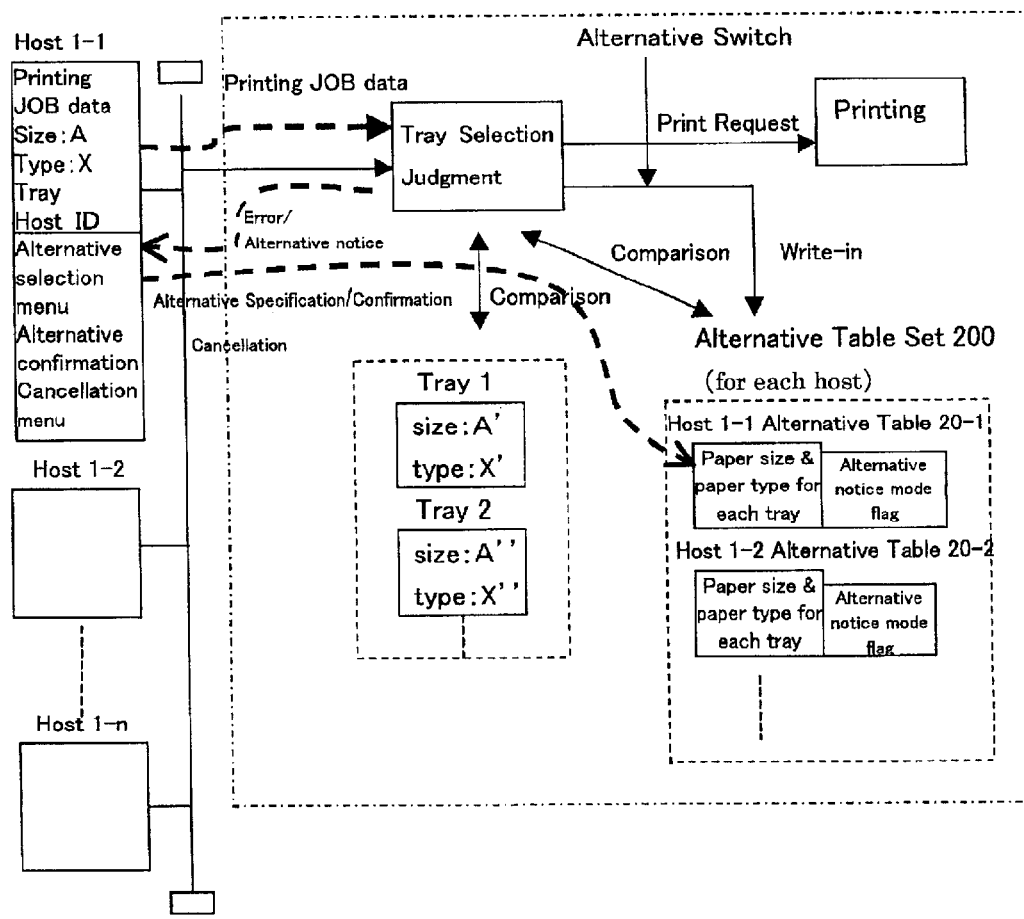
FIG. 17 is a schematic diagram of the printer according to the sixth embodiment of the present invention.

FIG. 17 is a schematic view of the printer according to the sixth embodiment of the present invention. The printer according to the sixth embodiment is connected to the plurality of host devices through the network. The alternative table set 200 of the printer has an alternative notice mode flag in each host device. If the alternative notice mode flag is a notice mode (ON), in the case where the alternative printing is executed, the alternative notice is transmitted in advance, and after reception of the alternative confirmation notice, the alternative printing is executed. Furthermore, when the alternative cancellation notice from the host device is received, the registered content (paper size, paper type) targeting the alternative printing is erased. Thus, as the printer becomes in the paper disagreement error condition, the error notice is transmitted to the host device. At the time of the error non-notice mode (OFF), the alternative notice is not transmitted, and the alternative printing is executed.

Figure 18A:
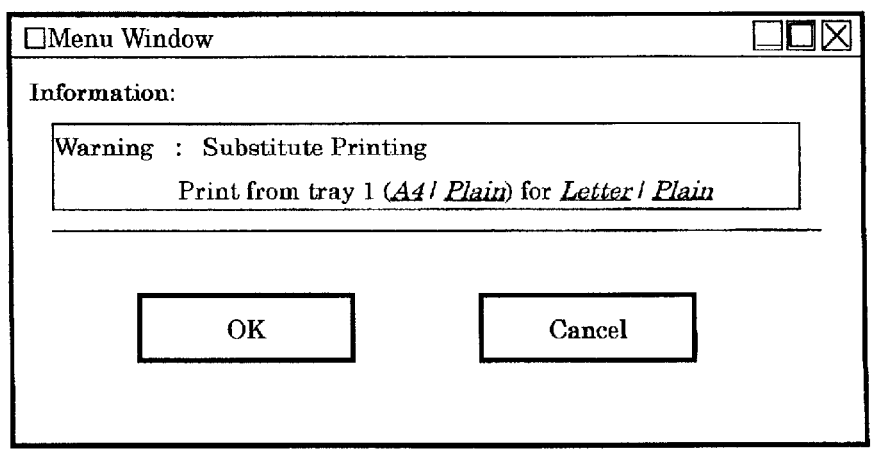
FIG. 18A and 18B are examples of menu screens displayed on a host device.
Figure 18B:
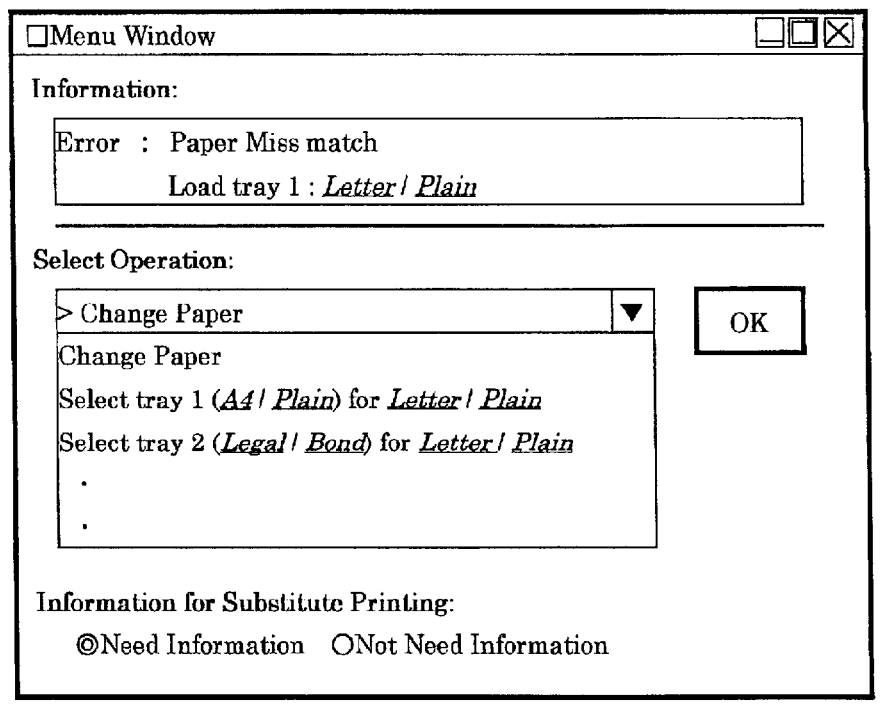

FIGS. 18A and 18B are examples of menu screens displayed in the host device. FIG. 18A is an example of a screen corresponding to an alternative notice of the host device. In FIG. 18A, if an "OK" button is clicked, the alternative confirmation notice is transmitted to the printer, and if a "Cancel" button is clicked, the alternative cancellation notice is transmitted.

Furthermore, in the case where the paper size and paper type specified are not registered in the alternative table 20 (containing the case where they are erased by the alternative cancellation notice), and the alternative printing is not performed, the error notice is transmitted to the host device.

With respect to the error notice, in the case where the paper size and paper type specified are registered in the alternative table, and the alternative printing is executed, the alternative specification notice is transmitted from the host device. In the case where the papers in the specified tray are replaced with correct papers, the paper disagreement error condition is maintained, while the host device cancels the error notice. In this condition, the papers of the tray are correctly replaced, and the error condition is cancelled, and the printing is executed.

FIG. 18B is an example of a screen corresponding to the error notice of the host device. In FIG. 18B, the user who operates the host device executes the alternative printing, the user selects the alternative tray, and clicks the "OK" button. Thus, the alternative specification notice is transmitted to the printer, and the paper size and paper type specified are registered in the alternative table corresponding to the alternative tray selected, and also the alternative printing is executed. Furthermore, in the case where the papers are replaced with the correct papers, the user selects "Change Paper" and clicks the "OK" button. Furthermore, the user can set the alternative notice mode flag from the screen of FIG. 18B. Namely, in the case where the notice mode will be set, "Need Information" is selected, and in the case where the non-notice mode will be set, "Not Need Information" has only to be selected.

Figure 19:
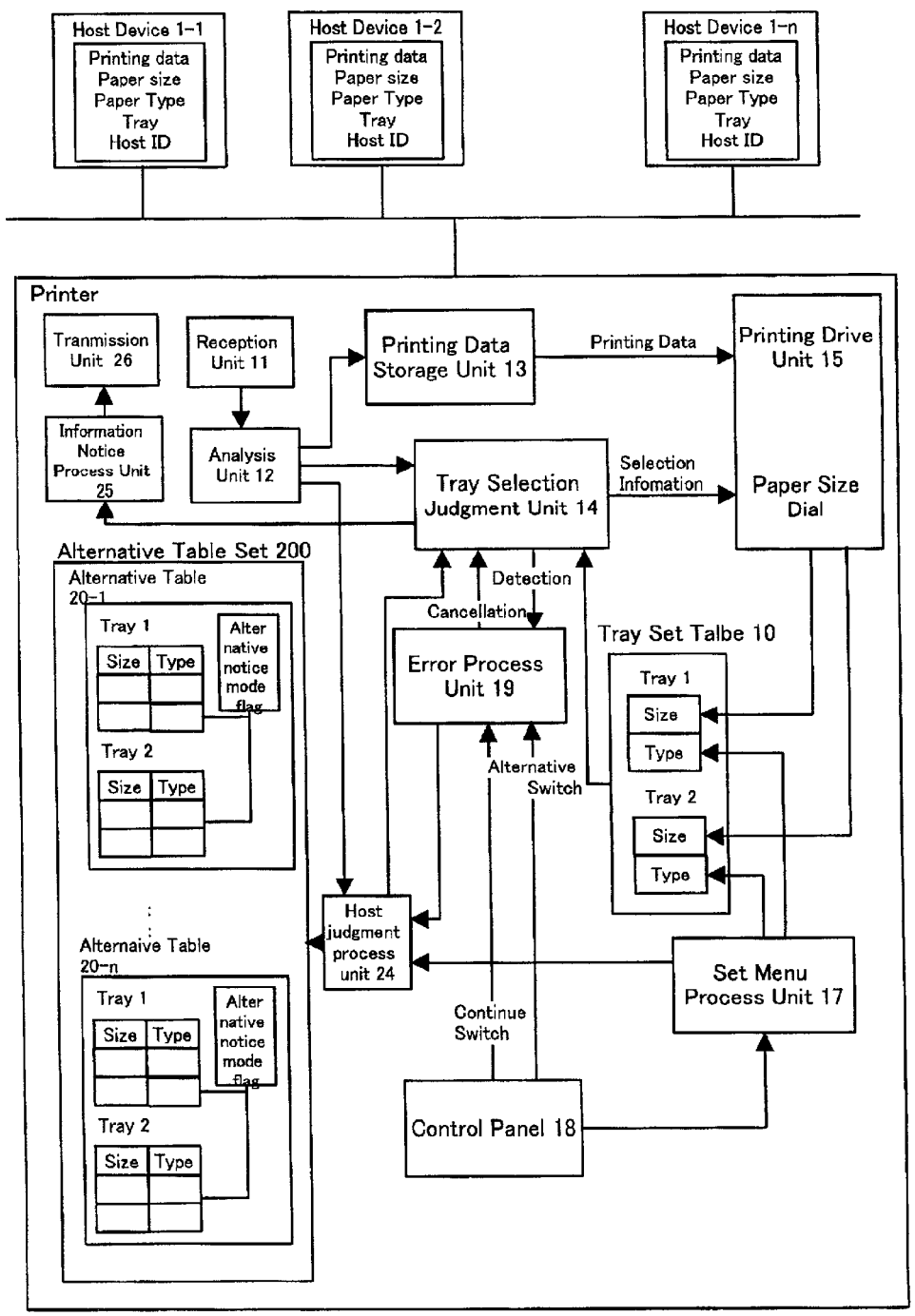
FIG. 19 is a block structural diagram of the printer according to the sixth embodiment.

FIG. 19 is a block structural diagram of a printer according to the sixth embodiment. In FIG. 19, the printer comprises an information notice process unit 25 and a transmission unit 26, and an alternative notice and an error notice are transmitted from the tray selection judgment unit 14 to the host device via the information notice process unit 25 and transmission unit 26. Furthermore, as described above, the alternative table set 200 has an alternative notice mode flag in each host device.

Figure 20:
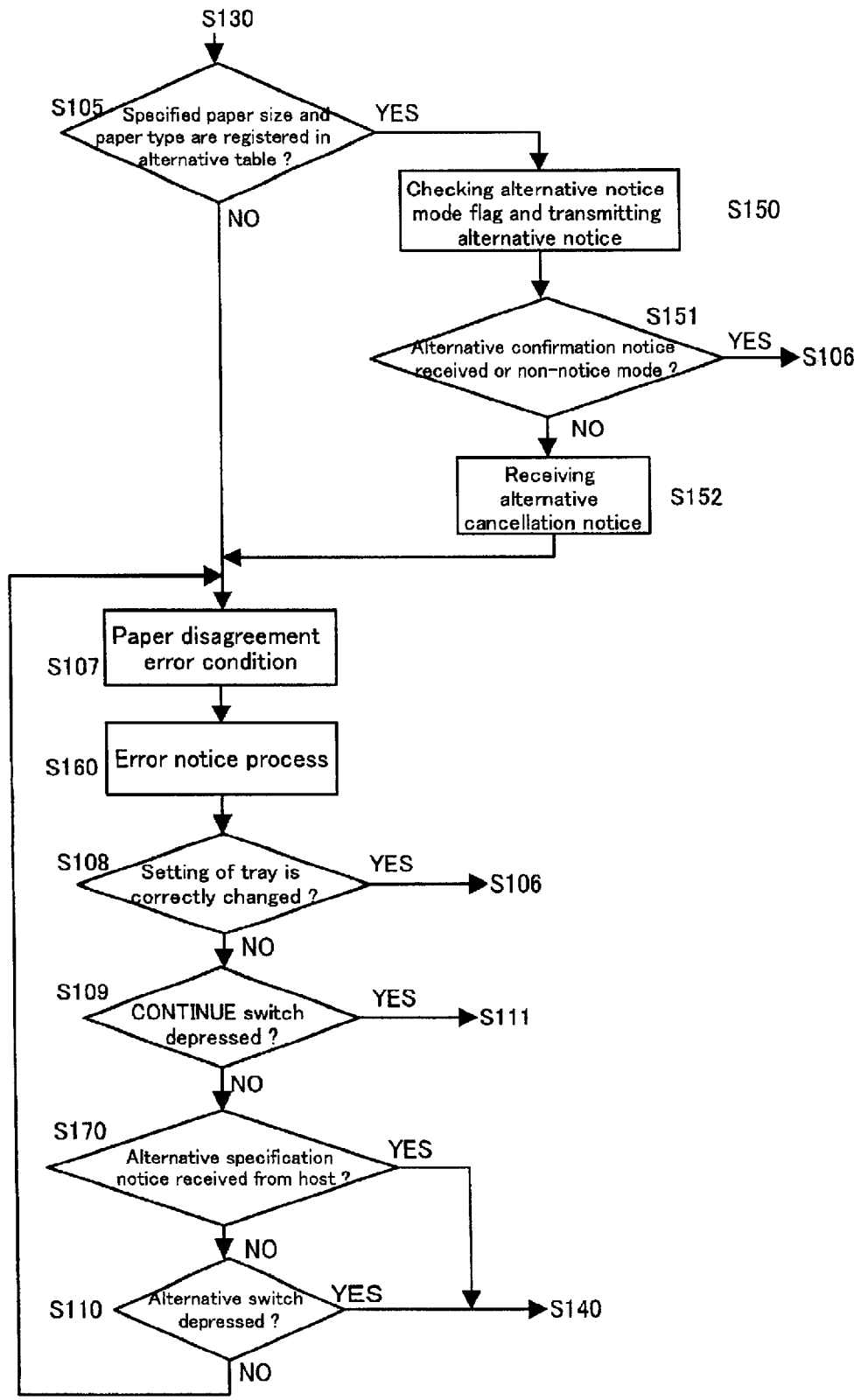
FIG. 20 is a flowchart of a printing processing according to the sixth embodiment.
Figure 21:
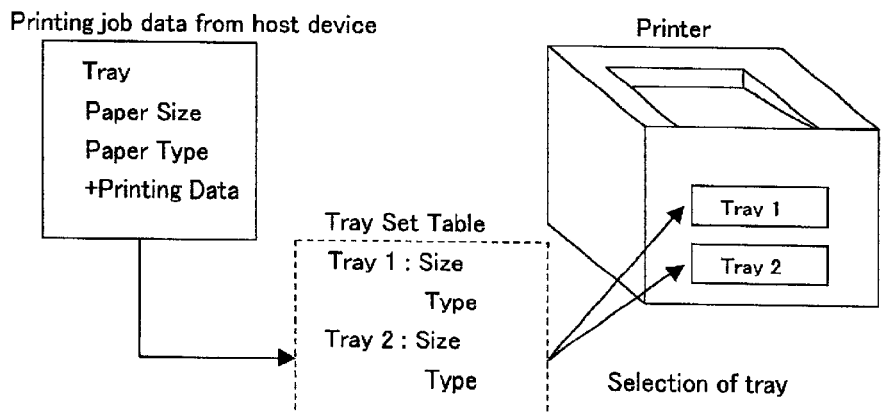
FIG. 21 is a typical view of selection of a tray.
Figure 22A:
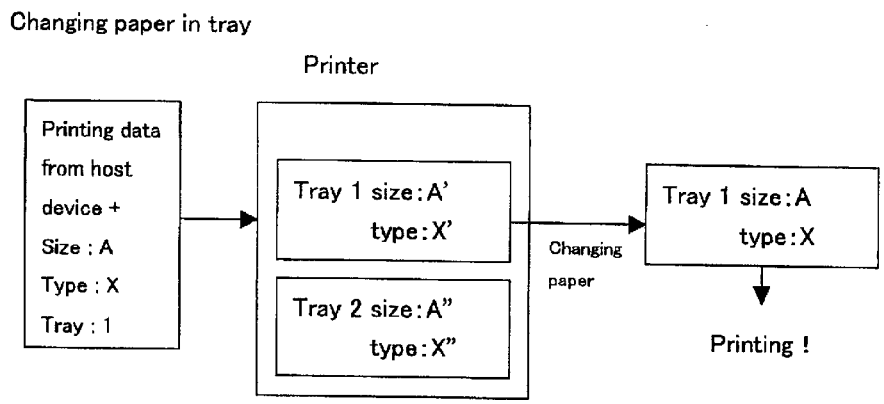
FIGS. 22A and 22B are diagrams for explaining a processing of canceling an error condition of the printer when a paper size and/or paper type are disagreed with each other.
Figure 22B:
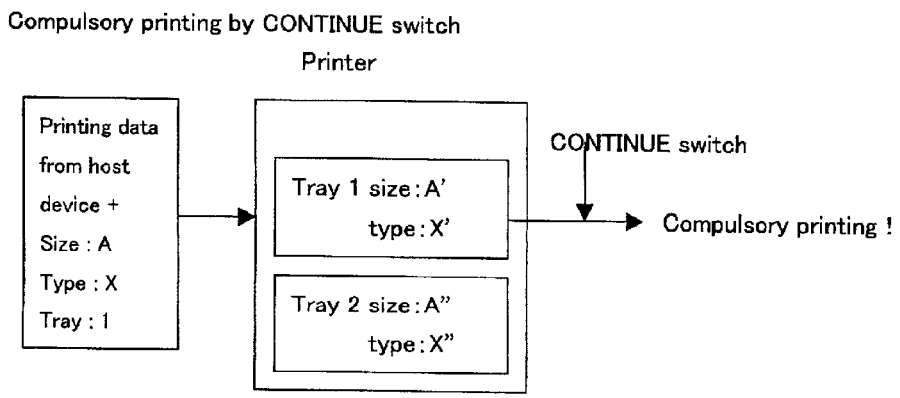

FIG. 20 is a flowchart of a printing process according to the sixth embodiment. In addition to the flowchart of FIG. 11, the following steps S150, S151, S152, S160, and S170 are added to the printing process according to the sixth embodiment. Incidentally, in FIG. 20, the added process unit is shown. In FIG. 20, at step S105, in the case where the alternative table 20 in which the specified paper size and paper type are registered is found out, the tray selection judgment unit 14 checks the alternative notice mode flag, and in the case where the alternative notice mode flag is a notice mode, the tray selection judgment unit 14 transmits the alternative notice to the host device, and stands by a reception of the confirmation notice (step S150). In the case where the tray selection judgment unit 14 receives the confirmation notice in response to the alternative notice, or the alternative notice mode flag is a non-notice mode (step S151), the printing process is executed (step S106). At step S152, if the tray selection judgment unit 14 does not receive the confirmation notice and receives the alternative cancellation notice, the tray selection judgment unit 14 clears target information registered in the alternative table, and becomes in the paper disagreement error condition.

On the other hand, in the case where not found out at step S105, the tray selection judgment unit 14 becomes in the paper disagreement error condition as described above (step S107), the tray selection judgment unit 14 transmits the error notice to the host device (step S160). In the paper disagreement error condition, as described above, setting of the tray is correctly changed (step S108), and the CONTINUE switch on the control panel is depressed (step S109), or the tray selection judgment unit 14 receives the alternative specification notice from the screen of FIG. 18B (step S170), and the alternative printing switch is directly depressed (step S110), so that the printing processing is executed (step S105). Incidentally, if the tray selection judgment unit 14 receives the alternative specification notice, in the same manner as in the case where the alternative printing switch is depressed, the processing at step S141 is executed.

Furthermore, the sixth embodiment is not limited to the printer connected to the network, and may be applied to the printer directly connected to the one host device.

Furthermore, in the same manner as in the above second, third, fourth, and fifth embodiments, the printer according to the sixth embodiment may comprise the alternative tray selection unit 21, the set menu process unit 17 with a table editing function, a function restriction judgment unit 22, and the clear judgment process unit 23.

Furthermore, according to the respective aforesaid embodiments, the alternative printing for specification of both the paper size and paper type was explained, but the respective aforesaid embodiments may be applied to any one of the paper size and paper type.

According to the present invention, in the case where the paper size and paper type other than that stored in the tray of the printer is specified by the printing job data, through registration to the alternative table an alternative printing is performed on the papers stored in a predetermined tray. Even in the case where there is no paper of a specified size and type the next time on, the printer does not become in the paper disagreement error condition, and the printing processing is executed. Thus, it is not necessary to change the setting of the tray or depress the CONTINUE switch in each printing job data, and the printing processing is continued. Therefore, operability in users is enhanced.

Furthermore, in the printer which is applied to the network connected to the plurality of host devices, the alternative table for registering the paper size and paper type for the alternative printing is managed in each host device. Accordingly, the information of the alternative information in each host device is independent, and the alternative table in one host device does not exert influences on the other host devices. As probability of the occurrence of disagreement errors is decreased by executing the alternative printing, it is possible to reduce influences on the other host devices owning jointly the printer, and to contribute to stabilization of a network constituted by the printer and the plurality of host devices.

The scope of protection of the present invention is not limited to the above embodiments but covers the invention defined by the appended claims and its equivalents.

What is claimed is:

1. A printer for selecting one of a plurality of trays based on paper information, which is at least one of paper size and paper type specified by printing job data from a host device, and printing on a paper stored therein, comprising:

an alternative table for registering paper information other than the paper information of the paper stored in a plurality of trays, for at least one tray among the plurality of trays according to a predetermined indication; and a tray selection unit for selecting the tray corresponding to the paper information of the alternative table based on the paper information specified by the print job data in the case where the paper corresponding to the paper information specified by the printing job data is not stored in any one of the plurality of trays.

2. The printer according to claim 1, wherein the indication is given in the case where the paper corresponding to the paper information specified by the printing job data is not stored in any one of the plurality of trays, and the paper information specified by the printing job data is not registered for the alternative table.

3. The printer according to claim 2, wherein the tray selection unit selects a tray specified by the printing job data based on the indication.

4. The printer according to claim 2, wherein the tray selection unit selects a tray specified by the indication.

5. The printer according to claim 1, wherein the paper information specified by the printing job data is registered for the tray specified by the printing job data in the alternative table according to the indication.

6. The printer according to claim 1, wherein the paper information specified by the printing job data is registered for the tray specified by the indication.

7. The printer according to claim 1, wherein, in case where the paper information of a paper stored in at least one of the plurality of trays is changed, the registered paper information of the alternative table is cleared.

8. The printer according to claim 1, wherein the paper information for a plurality of papers is registered for one tray in the alternative table.

9. The printer according to claim 1, wherein, in the case where the printer is connected to a plurality of host devices, the alternative table is provided in each host device and the tray selection unit selects one of the plurality of alternative tables based on host device identification information included in the printing job data.

10. The printer according to claim 1, further comprising: a transmission unit for transmitting an alternative printing confirmation request for the host device if a tray is selected from the alternative table; and a reception unit for receiving a confirmation notice from the host device, wherein after reception of the confirmation notice, a paper stored in the tray selected is printed.

11. The printer according to claim 1, further comprising: a transmission unit for transmitting a paper disagreement error information to the host device in the case where the paper corresponding to the paper information specified by the printing job data is not stored in any one of the plurality of trays, and the paper information specified by the printing job data is not registered for the alternative table; and a reception unit for receiving the indication from the host device in response to the paper disagreement error information.

12. The printer according to claim 1, wherein the alternative table is stored in a nonvolatile memory.

* * * * *